US011867387B2

(12) United States Patent
Lombard

(10) Patent No.: US 11,867,387 B2
(45) Date of Patent: Jan. 9, 2024

(54) HELMETS WITH LIGHTING AND LIGHTING SYSTEMS FOR HELMETS

(71) Applicant: Vernon Lombard, New Orleans, LA (US)

(72) Inventor: Vernon Lombard, New Orleans, LA (US)

( * ) Notice: Subject to any disclaimer, the term of this patent is extended or adjusted under 35 U.S.C. 154(b) by 0 days.

(21) Appl. No.: 17/811,666

(22) Filed: Jul. 11, 2022

(65) Prior Publication Data

US 2023/0003376 A1 Jan. 5, 2023

Related U.S. Application Data

(63) Continuation of application No. 17/171,376, filed on Feb. 9, 2021, now Pat. No. 11,391,455, which is a continuation of application No. 16/716,204, filed on Dec. 16, 2019, now Pat. No. 10,920,976, which is a continuation of application No. 16/042,802, filed on Jul. 23, 2018, now Pat. No. 10,514,161, which is a continuation of application No. 15/177,766, filed on Jun. 9, 2016, now Pat. No. 10,030,864.

(60) Provisional application No. 62/273,237, filed on Dec. 30, 2015, provisional application No. 62/209,270, filed on Aug. 24, 2015, provisional application No. 62/202,757, filed on Aug. 7, 2015, provisional application No. 62/173,300, filed on Jun. 9, 2015.

(51) Int. Cl.
*F21V 33/00* (2006.01)
*A42B 3/04* (2006.01)
*A42B 3/12* (2006.01)

(52) U.S. Cl.
CPC .......... *F21V 33/0008* (2013.01); *A42B 3/044* (2013.01); *A42B 3/122* (2013.01)

(58) Field of Classification Search
CPC ...... F21V 33/0008; A42B 3/044; A42B 3/122
See application file for complete search history.

(56) References Cited

U.S. PATENT DOCUMENTS

| | | | |
|---|---|---|---|
| 4,231,079 | A | 10/1980 | Heminover |
| 4,891,736 | A | 1/1990 | Gouda |
| 4,956,752 | A | 9/1990 | Foglietti |
| 5,040,099 | A | 8/1991 | Harris |
| 5,327,587 | A | 7/1994 | Hurwitz |
| 5,353,008 | A | 10/1994 | Eikenberry et al. |
| 5,357,409 | A | 10/1994 | Glatt |
| 5,416,675 | A | 5/1995 | DeBeaux |

(Continued)

OTHER PUBLICATIONS

International Search Report; Application No. PCT/US2011/062243; dated Nov. 28, 2011.

*Primary Examiner* — Thomas M Sember
(74) *Attorney, Agent, or Firm* — Knobbe Martens Olson & Bear LLP

(57) ABSTRACT

Helmets and helmet lighting systems for use in demanding environments, such as fire, rescue, police and military applications. The helmets and systems provide one or more of high levels of light emission, long operational life, waterproofing/ability to operate in wet or submerged environments and relatively low weight. In some configurations, a helmet comprises a lighting system including an exterior layer and an interior layer applied to a shell of the helmet. In some configurations, a lighting module having an internal layer and an exterior layer is attached to an underlying helmet. In some configurations, a lighting system includes pods and/or strips containing a source of light. The pods or strips can be attached to an underlying helmet.

9 Claims, 22 Drawing Sheets

(56) References Cited

U.S. PATENT DOCUMENTS

| | | | |
|---|---|---|---|
| 5,426,792 | A | 6/1995 | Murasko |
| 5,477,209 | A | 12/1995 | Benson, Jr. et al. |
| 5,479,325 | A | 12/1995 | Chien |
| 5,485,358 | A | 1/1996 | Chien |
| 5,564,128 | A | 10/1996 | Richardson |
| 5,570,946 | A | 11/1996 | Chien |
| 5,758,947 | A | 6/1998 | Glatt |
| 5,810,467 | A | 9/1998 | Hurwitz |
| 5,871,271 | A | 2/1999 | Chien |
| 5,910,764 | A | 6/1999 | Hayden |
| 5,931,559 | A | 8/1999 | Pfaeffle |
| 6,007,213 | A | 12/1999 | Baumgartner |
| 6,101,636 | A | 8/2000 | Williams |
| 6,159,324 | A | 12/2000 | Watters et al. |
| 6,244,721 | B1 | 6/2001 | Rodriquez et al. |
| 6,325,521 | B1 | 12/2001 | Gregg et al. |
| 6,328,454 | B1 | 12/2001 | Davis |
| 6,348,859 | B1 | 2/2002 | Baker |
| 6,406,168 | B1 | 6/2002 | Whiting |
| 6,499,145 | B1 | 12/2002 | Kates |
| 6,529,128 | B2 | 3/2003 | Henry |
| 6,532,602 | B2 | 3/2003 | Watters et al. |
| 6,686,837 | B2 | 2/2004 | Kim |
| 6,720,870 | B2 | 4/2004 | Morse |
| 6,752,510 | B1 | 6/2004 | Appiah |
| 6,784,795 | B1 | 8/2004 | Pories et al. |
| 6,933,839 | B2 | 8/2005 | Henry |
| 6,935,761 | B2 | 8/2005 | Vanderschuit |
| 7,111,956 | B2 | 9/2006 | Brown |
| 7,121,076 | B2 | 10/2006 | Priegelmeir et al. |
| 7,121,676 | B1 | 10/2006 | Kutnyak |
| 8,192,043 | B2 | 6/2012 | Lombard |
| 8,608,333 | B2 | 12/2013 | Lombard |
| 2003/0137413 | A1 | 7/2003 | Morse |
| 2003/0231109 | A1 | 12/2003 | Kim |
| 2004/0008106 | A1 | 1/2004 | Konczai |
| 2004/0227628 | A1 | 11/2004 | Burdick |
| 2005/0134439 | A1 | 6/2005 | Moore et al. |
| 2008/0080171 | A1 | 4/2008 | Lombard |
| 2011/0069476 | A1 | 3/2011 | Lombard |
| 2020/0158327 | A1 | 5/2020 | Lombard |

HELMETS WITH LIGHTING AND LIGHTING SYSTEMS FOR HELMETS

BACKGROUND

Field

The present disclosure relates to helmets. More particularly, the present disclosure relates to helmets with light sources and light source systems for mounting to an underlying helmet.

Description of the Related Art

Helmets with lighting systems exist. However, existing systems are generally directed toward recreational helmet applications and are not suitable for use in more demanding environments, such as water or fire environments, for example. In addition, existing systems can be heavy and bulky, can provide low levels of light emission and can have relatively short operational times.

SUMMARY

The systems, methods and devices described herein have innovative aspects, no single one of which is indispensable or solely responsible for their desirable attributes. Without limiting the scope of the claims, some of the advantageous features will now be summarized.

In at least some configurations, the helmets and helmet lighting systems described herein are well-suited for use in demanding environments, such a fire and rescue, police and military applications. The helmets and systems described herein provide one or more of high levels of light emission, long operational life, waterproofing/ability to operate in wet or submerged environments and relatively low weight. For example, in at least some applications, the helmet can be worn for long periods of time and/or during intense physical activity. Accordingly, even small reductions in weight (e.g., in the range of 1-100 grams or 0.1-5 or 10 ounces) can result in a meaningful increase in performance. The helmets and systems (e.g., shells or modules) improve upon the prior art, the helmets and systems (e.g., shells) disclosed in Applicant's U.S. Pat. Nos. 7,845,816; 8,192,043 and 8,608,333, or provide the public with a useful choice.

In some configurations, a helmet with lighting system comprises a helmet shell, a plurality of light sources secured to the helmet shell, a source of power for powering the plurality of light sources, a controller for controlling the power provided to the plurality of light sources and electrical conduits for communicating between the plurality of light sources, the source of power and the controller. An external layer is applied to the helmet shell and an internal layer is applied to the helmet shell. At least the plurality of light sources and the electrical conduits are encapsulated between the external layer and the internal layer.

In some configurations, the external layer and the internal layer are sealed to one another or each to the helmet shell such that water ingress between the external layer and the internal layer is prevented.

In some configurations, at least one of the external layer and the internal layer is positioned against the helmet shell such that there is no air space between the helmet shell and the at least one of the external layer and the internal layer.

In some configurations, the helmet shell comprises a plurality of openings, each of which is configured to receive one or more of the plurality of light sources.

In some configurations, the source of power comprises a plurality of curved, sheet-like batteries arranged within an interior of the helmet shell and along an interior surface of the helmet shell.

In some configurations, the helmet includes one or more water vents passing through the external layer, the helmet shell and the internal layer, wherein the water vents are sealed to prevent the ingress of water between the external layer and the internal layer at the water vents.

In some configurations, a lighting module for an underlying helmet includes an external layer and an internal layer. The external layer and the internal layer comprise a space therebetween. The external layer and the internal layer are sealed relative to one another to prevent ingress of water into the space. The lighting module also includes a plurality of light sources, a source of power for powering the plurality of light sources, a controller for controlling the power provided to the plurality of light sources and electrical conduits for communicating between the plurality of light sources, the source of power and the controller. At least the plurality of light sources and the electrical conduits are encapsulated within the space between the external layer and the internal layer. The lighting module is configured to be attached to the underlying helmet and covers only a portion of the underlying helmet.

In some configurations, the lighting module is configured to leave a top portion of the underlying helmet exposed.

In some configurations, the lighting module completely encircles the underlying helmet.

In some configurations, the lighting module is attached to the underlying helmet by an adhesive.

In some configurations, a lighting system for an underlying helmet includes at least one light pod comprising at least one light source, a light pod enclosure, at least one light strip comprising at least one light source, and a light strip enclosure. Each of the light pod enclosure and the light strip enclosure comprises an interior space therewithin. The space is sealed to prevent ingress of water into the space. The system also includes a source of power for powering the light sources, a controller for controlling the power provided to the light sources, and a plurality of electrical conduits for communicating between the light sources, the source of power and the controller. At least the light sources and portions of the electrical conduits are encapsulated within the space. The light pod enclosure and light strip enclosure are each configured to be attached to the underlying helmet and cover only a portion of the underlying helmet.

In some configurations, the light pods and light strips are attached to the underlying helmet by an adhesive.

In some configurations, each of the light pod enclosure and the light strip enclosure further comprises a base layer and a cover layer, the base layer and the cover layer defining the space therebetween, the base layer and the cover layer being sealed relative to one another to prevent ingress of water into the space.

In some configurations, the base layer is dark.

In some configurations, the space tightly encloses the light sources and electrical conduits.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
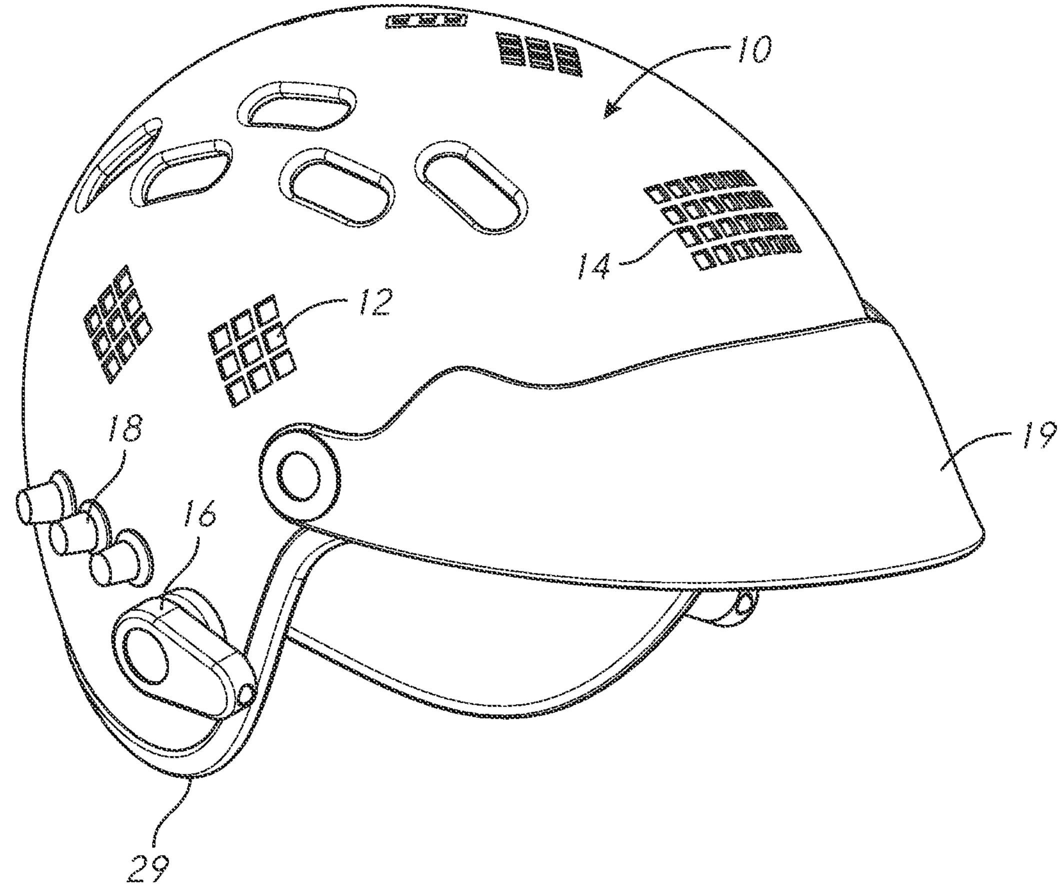
FIG. 1 is a perspective view of a helmet incorporating a lighting system having certain features, aspects and advantages of the present disclosure.
Figure 2:
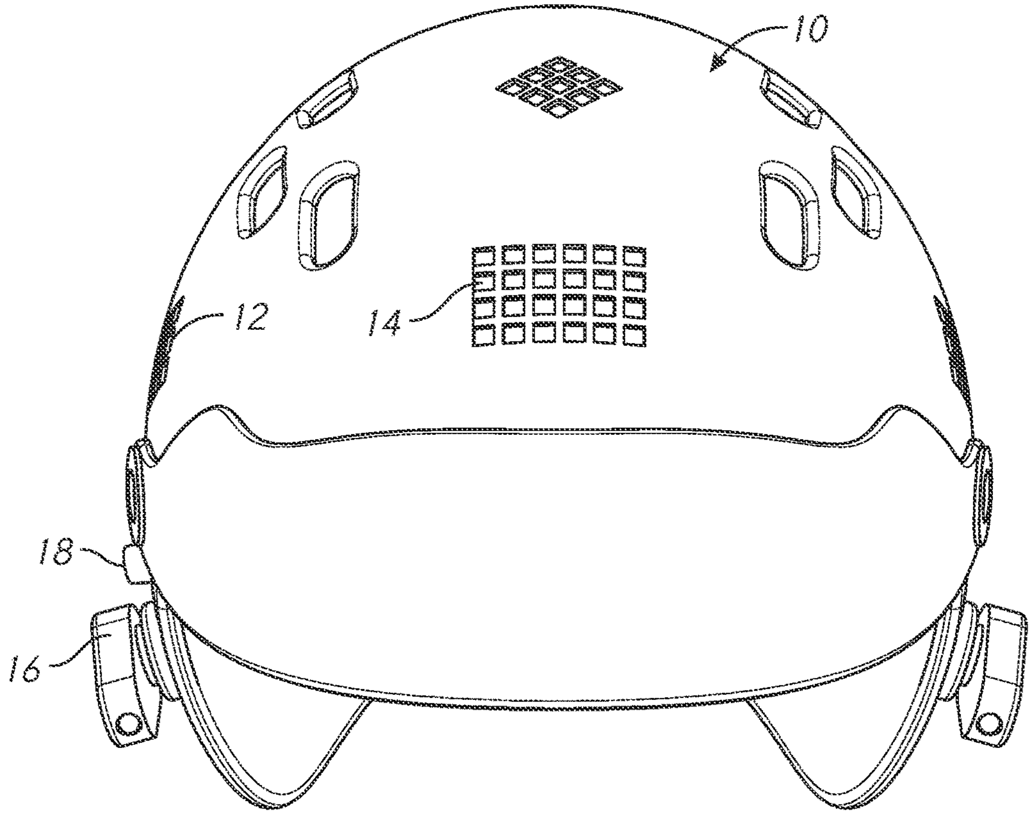
FIG. 2 is a front view of the helmet of FIG. 1.
Figure 3:
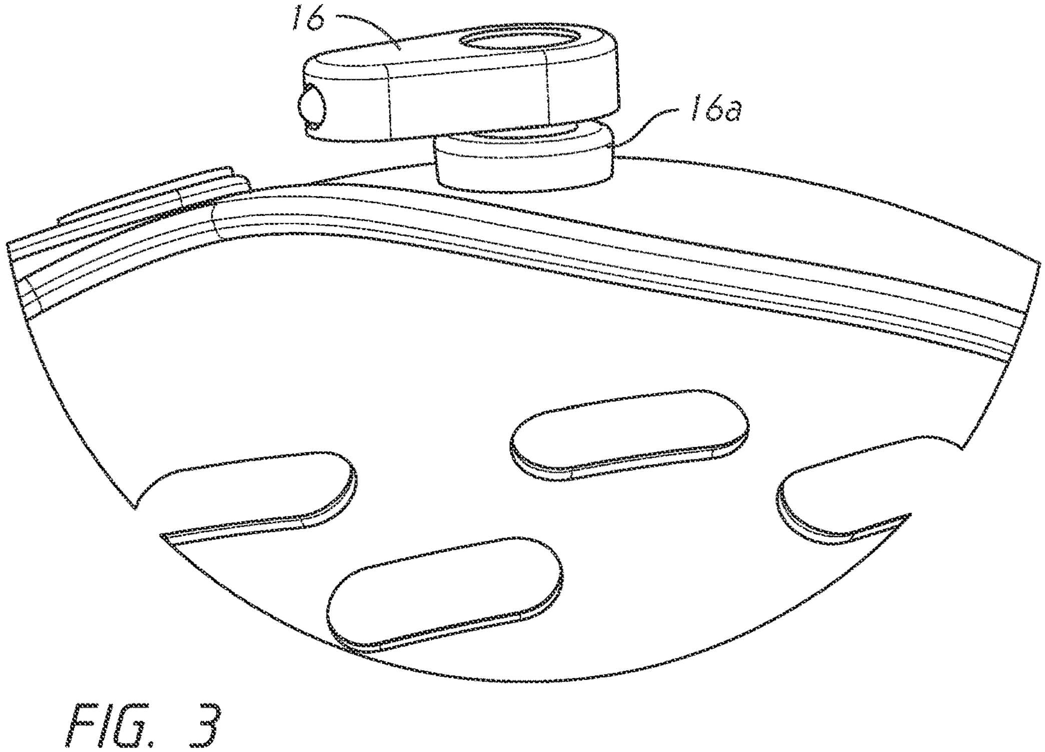
FIG. 3 is a top view of a portion of the helmet of FIG. 1 that includes a headlight.
Figure 4:
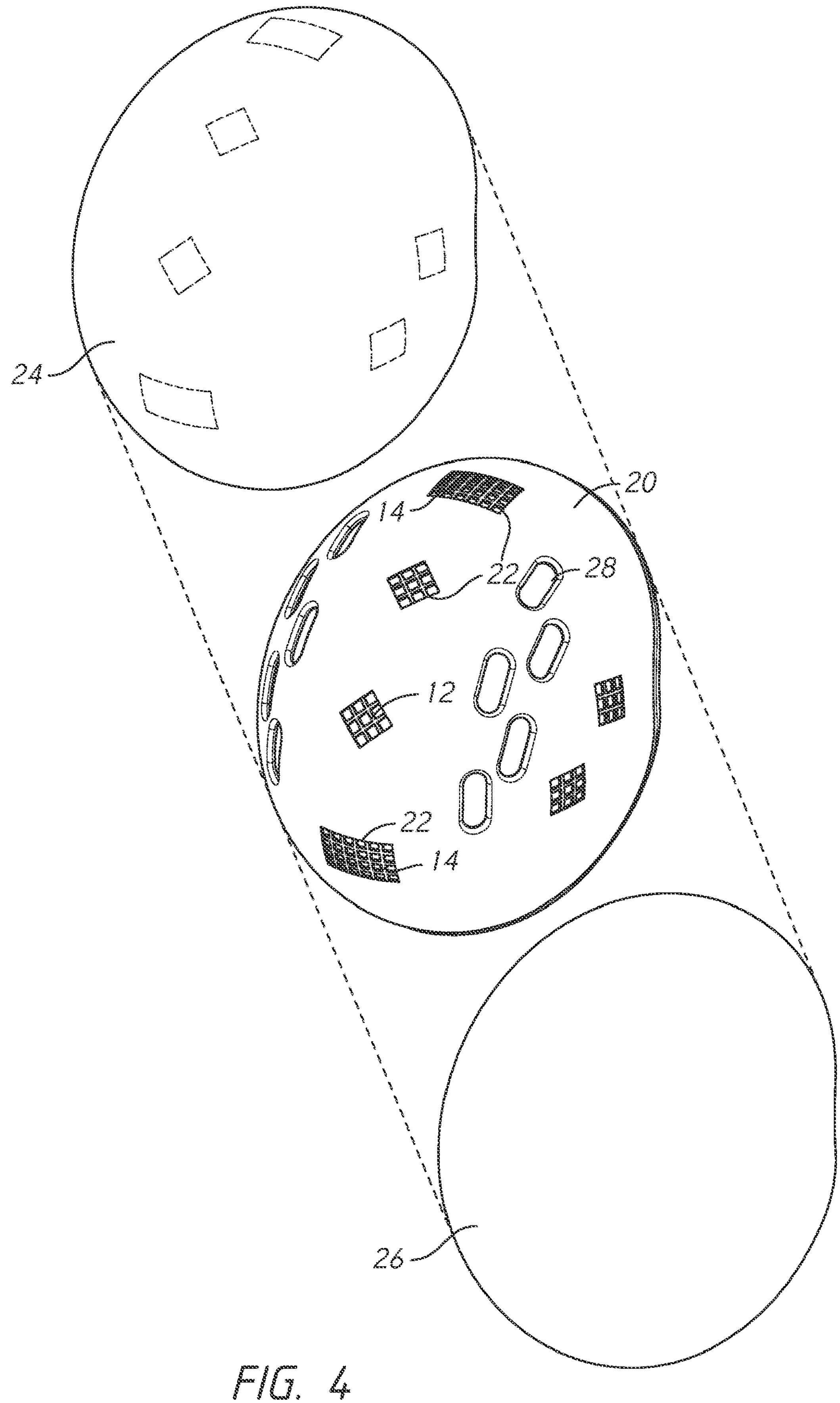
FIG. 4 is a perspective view of the helmet of FIG. 1 in an exploded condition showing an outer layer, a shell and an inner layer.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as “above” and “below” refer to directions in the drawings to which reference is made. Terms such as “front,” “back,” “left,” “right,” “rear,” and “side” describe the orientation and/or location of portions of the components or elements within a consistent but arbitrary frame of reference which is made clear by reference to the text and the associated drawings describing the components or elements under discussion. Moreover, terms such as “first,” “second,” “third,” and so on may be used to describe separate components. Such terminology may include the words specifically mentioned above, derivatives thereof, and words of similar import.

Overview

In some configurations, the helmets and lighting systems for helmets described herein include a plurality of individual light sources, such as LEDs, configured to emit light from an exterior of the helmet. Such an arrangement provided visibility to the helmet and wearer of the helmet. Visibility may be desirable for rescue helmets, fire helmets, police helmets, military helmets, vehicle (motorcycle, bicycle) helmets or sports helmets, for example and without limitation. The basic arrangement of lights, wiring, controllers and batteries can be the same as or similar to those described in Applicant’s U.S. Pat. Nos. 7,845,816; 8,192,043 and 8,608,333, the entireties of which are incorporated by reference herein. The basic arrangements disclosed in those patents can be modified as described below.

Helmet with Integrated Lighting System

FIGS. 1-5 illustrate a helmet with an integrated lighting system 10 can include a plurality of lights, which can comprise one or more solid (non-flashing or non-strobe) lights 12 and one or more strobe lights 14. For example, the helmet 10 can include seven (or another number of) solid lights 12, which can be oriented in a diamond shape, and four strobe lights 14. The solid lights 12 can be positioned in pairs on the top and each side of the helmet 10. The strobe lights 14 can be positioned on a front, rear and each side (e.g., rearward side) of the helmet 10. However, other numbers and/or orientations of the lights 12, 14 can be used.

In some configurations, the helmet 10 includes one or more headlights 16. In the illustrated arrangement, the helmet 10 includes a headlight 16 on each side of the helmet 10. The headlights 16 can pivot relative to the helmet 10 about one or more axes of rotation, such as a horizontal and/or vertical axis. Each of the lights 12, 14, 16 can comprise any suitable light source, such as one or more light emitting diodes or devices (LED), for example and without limitation. The lights 12, 14, 16 can be any suitable color, such as green for the solid lights 12 and white for the strobe lights 14 and headlights 16.

The illustrated helmet 10 includes user interfaces, such as three button switches 18. In other arrangements, other numbers of switches 18 can be provided depending on, for example, the number of systems or components employed or the number of systems or components for which individual control is desired. In the illustrated arrangement, the switches 18 comprise one switch for headlights 16, one switch for green lights 12, and one switch for strobe lights 14. Other suitable controls can be provided in addition or in the alternative. For example, a remote control can be provided and, in some configurations, can be configured for connection to the user's wrist, like a watch or sleeve. If desired, the helmet 10 (or other system or shell disclosed herein) can be configured for connection to a smart device (e.g., phone, watch or tablet) or other connectable device capable of communication and control of the helmet 10 via a suitable protocol (e.g., Bluetooth or another wireless protocol). In some configurations, one or more features of the helmet 10 can be configured to be activated in response to input received by a sensor, such as a motion, light, touch (e.g., capacitive) or water sensor, for example and without limitation. In some configurations, such as helmets 10 intended for sports applications (e.g., hockey and football), one or more features (e.g., one or more lights) of the helmet 10 can be activated in response to an impact force received by the helmet 10 or a wearer of the helmet 10. For example, an accelerometer or acceleration sensor can be employed to sense acceleration events and a processor can be employed to determine impact forces resulting from the output of the accelerometer or other acceleration sensor. The remote control can be operated by a third person or can be operated by an automated system, which could incorporate sensors (e.g., proximity sensor). For example, the one or more features of the helmet 10 (e.g., one or more lights) can be configured to activate if the wearer of the helmet 10 crosses a line (e.g., a goal line) that incorporates a sensor configured to detect the helmet 10.

In the illustrated arrangement, the helmet 10 comprises multiple layers that enclose the lighting system such that the helmet 10 is waterproof. That is, the helmet 10 is capable of using the lighting system in a water environment. In the illustrated arrangement, the helmet 10 includes a structural layer or shell 20, which can be the toughest or strongest layer of the helmet 10 and, in some cases, can provide a substantial portion or an entirety of the structure necessary to allow the helmet 10 to meet applicable impact or other standards for the intended purpose. In some configurations, the structural shell 20 includes openings 22 that accommodate the lights 12 or 14.

Preferably, the helmet 10 includes at least one additional layer on one or both sides of the structural shell 20. In the illustrated configurations, the helmet 10 includes an outer cover layer 24 on the outside of the structural shell 20 and an inner cover layer 26 on the inside of the structural shell 20. However, in other arrangements, one of the cover layers 24, 26 can be omitted. For example, the inner cover layer 26 could be omitted and the lighting system or portions thereof can be encapsulated between the structural shell 20 and the outer cover layer 24 in a manner similar to the arrangements disclosed in Applicant's related patents identified above. In the illustrated configuration, the outer cover layer 24 is spaced from the structural shell 20 at least a small distance to accommodate the lights 12, 14. The inner cover layer 26 is tight against an interior of the structural shell 20, in at least some locations, and secures one or more of wiring, controllers or circuit boards and batteries in place on the inside of the structural shell 20. For example, the inner cover layer 26 can be tight against the shell 20 except for intervening components, such as wiring, controllers, circuit boards or batteries. Although not shown, one or more of padding, foam or other energy absorbing or dissipating layers or materials, or other liner can be placed within the structural shell 20 and inner cover layer 26. Such materials and arrangements are well-known in the art.

The structural shell 20 and additional layers 24 or 26 can be made from any suitable material or combination of materials. For example, in some configurations, the structural shell 20 can be constructed from a rigid material, such as a rigid plastic or composite (e.g., fiberglass or carbon fiber). In some configurations, one or both of the outer cover layer 24 and inner cover layer 26 is constructed in whole or in part of PETG material. Preferably, at least the outer cover layer 24 is clear to permit the lights 12, 14 to be visible through the outer cover layer 24. Portions of the outer cover layer 24 can be painted or otherwise covered with portions overlapping the lights 12, 14 left clear. Other suitable materials can also be used. In the illustrated arrangement, the PETG material is vacuum formed against the inside surface of the structural shell 20 to form the inner cover layer 26. The PETG material is vacuum formed against a mold to create the outer cover layer 24, which is then coupled to the structural shell 20 and/or the inner cover layer 26. The outer cover layer 24 and inner cover layer 26 are coupled to one another, such as along the edges of the helmet 10 and at vent openings 28 of the helmet 10, if present, to create a dust encased, waterproof casing for the lights and/or other electronics. Alternatively, the outer cover layer 24 and inner cover layer 26 can be coupled to the structural shell 20. In either case, the space between the outer cover layer 24 and inner cover layer 26 is sealed to substantially inhibit or prevent the ingress of water into the space between the layers 24, 26 at least for a desired service period within a water environment, which may be at least several hours, several days or longer. That is, the lights and/or other electronics can be encased between outer and inner layers 24, 26 of PETG or other suitable material. The lights and/or other electronics can be attached to or within openings 22 of the helmet shell 20 prior to the application of the outer and inner layers 24, 26. In other arrangements, the PETG or other material of the outer and/or inner layers 24, 26 can be otherwise applied to the helmet shell 20, such as by injection molding, for example and without limitation.

In some configurations, a helmet similar to that described herein includes an outer skin of latex, rubber (or another suitable, preferably stretchable, material) that is permanently adhered or otherwise attached to the exterior PETG (or other material) layer of the helmet, which can include windows in the latex or rubber that conform to the shell. A conduit can permit air or another gas to be introduced into and evacuated from a space between the helmet exterior and the latex or rubber layer to allow the helmet to be partially or completely buoyant. The air or other gas can be introduced into or evacuated from the space manually or automatically (e.g., via a compressed gas charge triggered by a water sensor). In some configurations, a plurality of smaller inflation spaces are provided to provide the helmet with buoyancy, as described further below.

Figure 5:
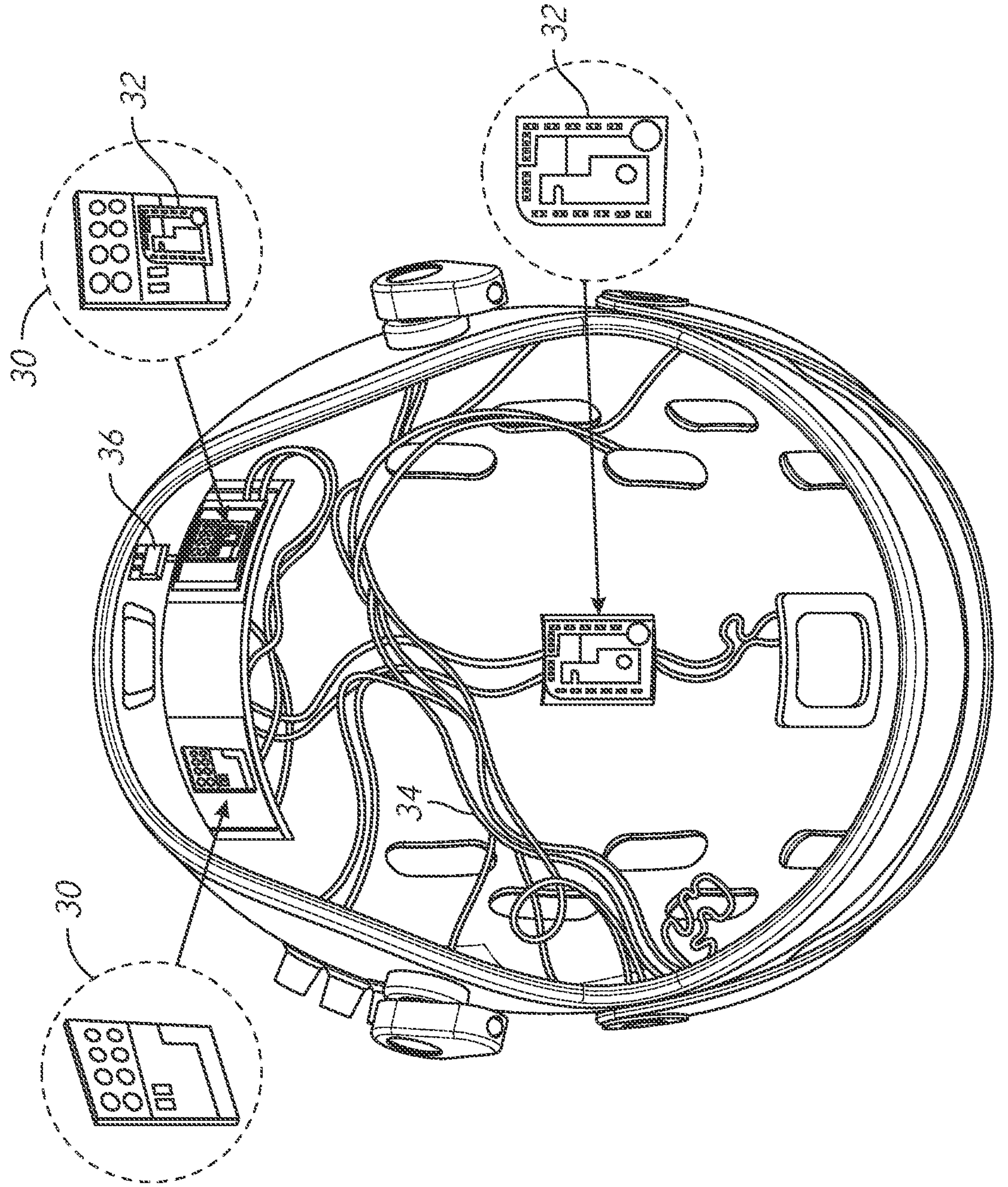
FIG. 5 is a view of an interior of the helmet of FIG. 1.

FIG. 5 illustrates an interior of a helmet 10, which includes one or more batteries 30, one or more circuit boards 32 and wiring 34 that couples the batteries 30 and circuit boards 32 to one another and/or to the lights 12, 14, 16. The batteries 30 can be positioned at a rear of the helmet 10. At least one circuit board 32 can be positioned at the top of the helmet 10. In the illustrated arrangement, one circuit board 32 is positioned near or is integrated with a battery 30 at the rear of the helmet 10. In at least some configurations, there is a charger port 36 at, for example, the rear of the helmet 10.

Figure 6:
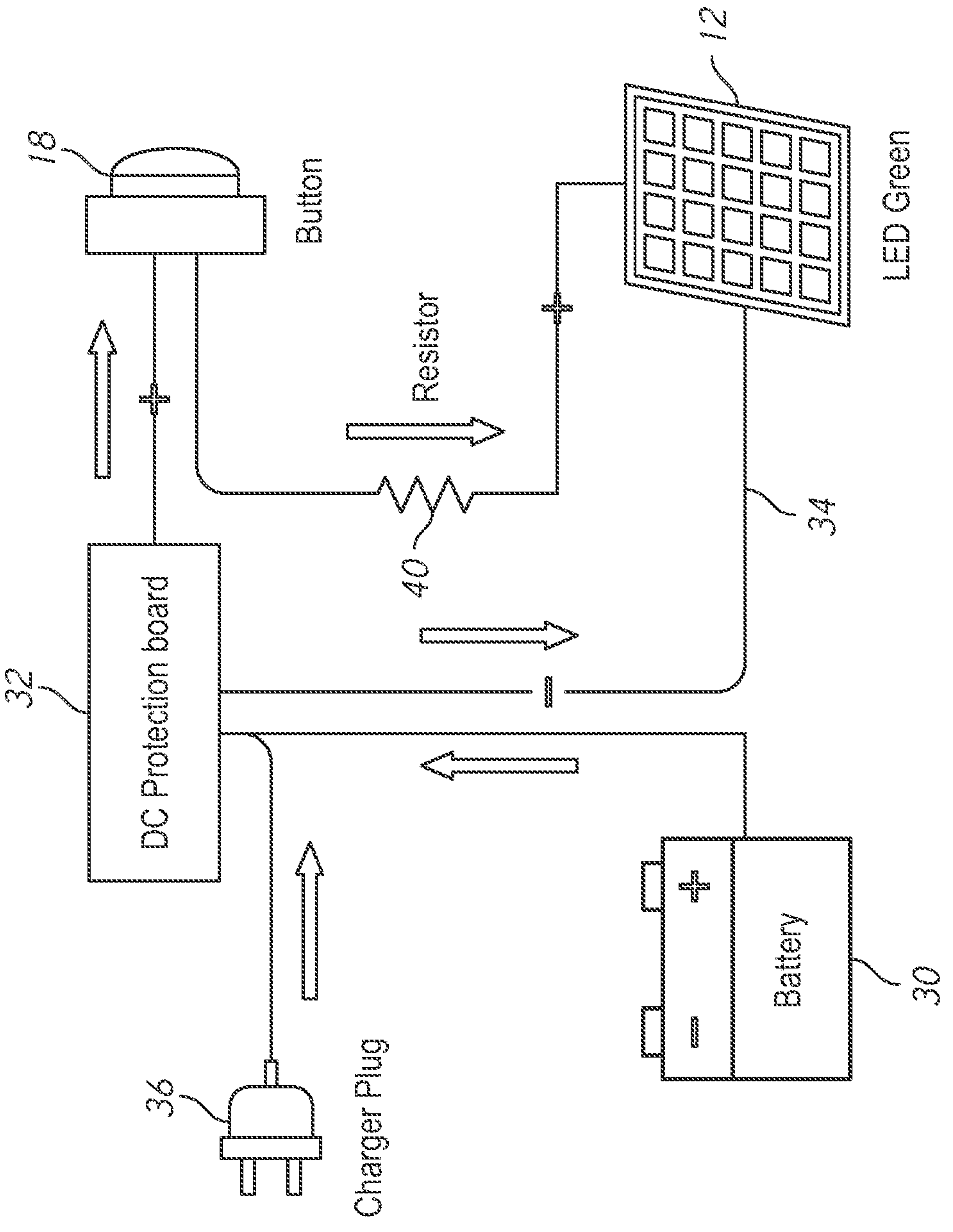
FIG. 6 is a diagram of a light of the helmet of FIG. 1.
Figure 7:
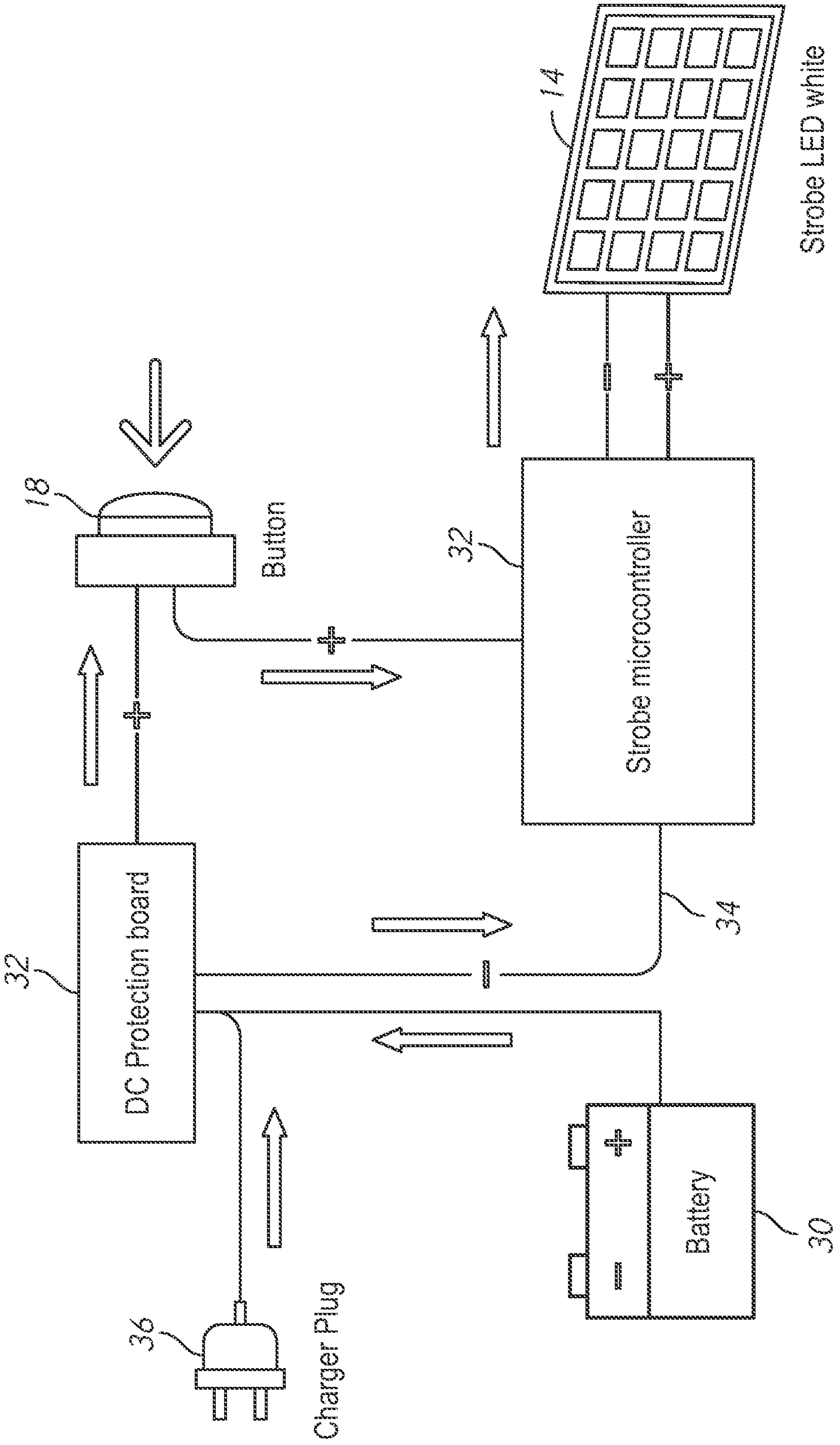
FIG. 7 is a diagram of a strobe light of the helmet of FIG. 1.
Figure 8:
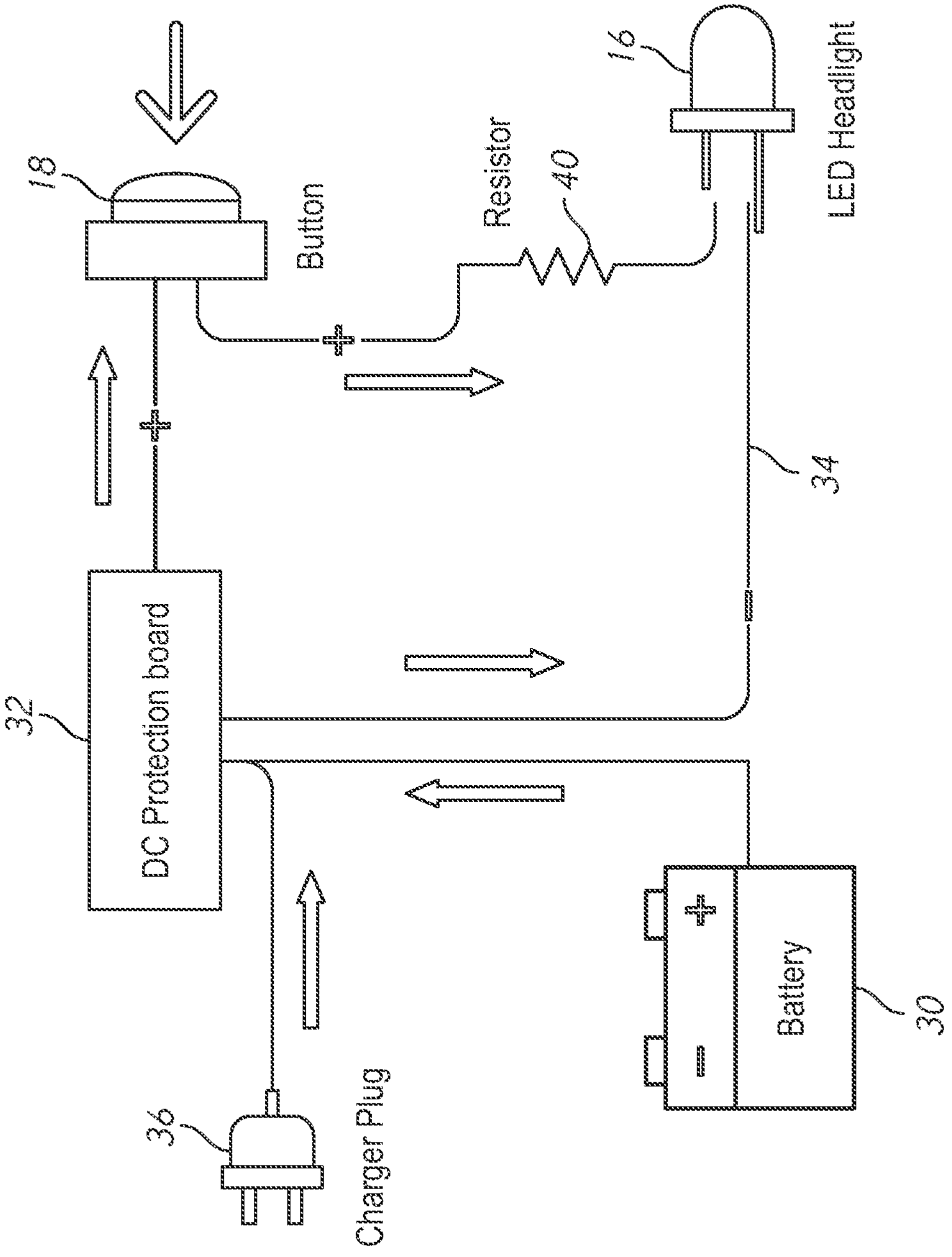
FIG. 8 is a diagram of a headlight of the helmet of FIG. 1.

FIGS. 6-8 illustrate wiring diagrams for each of the solid lights 12, strobe lights 14 and headlights 16. FIGS. 6-8 illustrate wiring diagrams for each light 12, 14, 16 as a separate circuit; however, in other configurations, two or more of the lights 12, 14, 16 can be included in a single circuit or as an integrated electronic system, as described further below. FIG. 6 illustrates a circuit for the solid lights 12 (illustrating one solid light 12 as an example) and includes a battery 30, a DC protection board 32, a switch or button 18, a charger plug 36 and a resistor 40. Electrical wiring 34 or other means of transmitting electrical signals connects the above-mentioned components. The DC protection board 32 protects the battery 30, the lights 12 and possibly other components of the system from damage, such as voltage or current spikes or electrical shorts. The DC protection board 32 can also control charging of the battery 30. The button 18 is a user interface or control that connects or disconnects the battery 30 to or from the lights 12 and allows a user to operate the lights 12. The circuit includes a resistor 40 that can be selected to influence or determine the electrical current within the circuit.

FIG. 7 illustrates a wiring diagram of the strobe lights 14. The circuit of the strobe lights 14 is substantially similar to the circuit of the solid lights 12 described above. However, the strobe lights 14 are connected to the battery 30 and/or other portions of the circuit via a strobe microcontroller 32, which can replace the resistor 40 of the prior circuit. The strobe microcontroller 32 is configured to operate the strobe lights 14. In particular, the strobe microcontroller 32 can control the strobe function of the strobe lights 14, or turn the strobe lights 14 on and off. One or both of the protection board 32 and the strobe microcontroller 32 can be configured to reduce or minimize power usage, as described further below.

FIG. 8 illustrates a wiring diagram of the headlights 16. The circuit of FIG. 8 is identical to the circuit of FIG. 6, except the solid lights 12 are replaced with the headlights 16. Other suitable arrangements can also be employed, such as integrating portions of the separate circuits illustrated in FIGS. 6-8.

Figure 9:
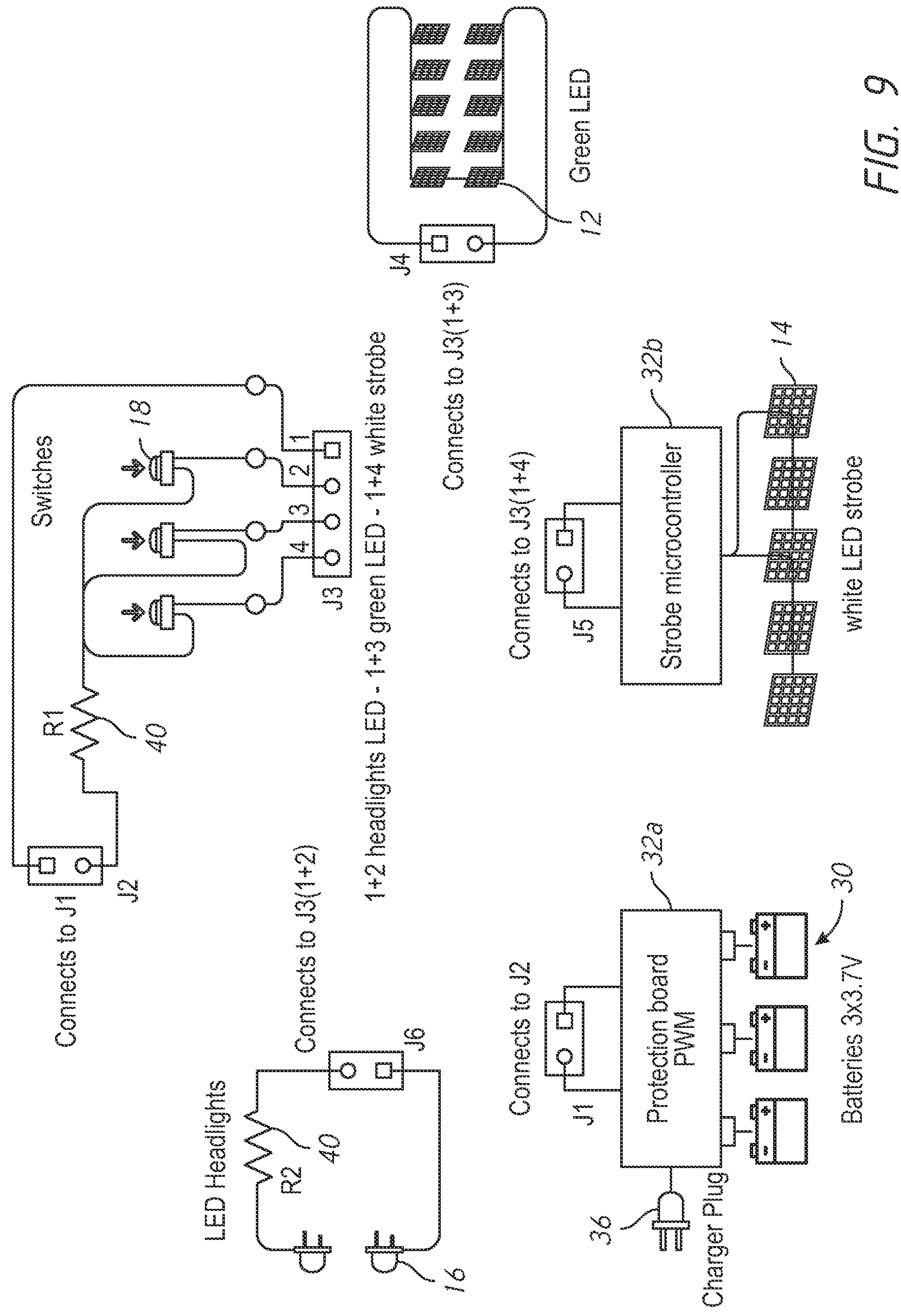
FIG. 9 is an overall diagram of the lighting system of the helmet of FIG. 1.
Figure 10:
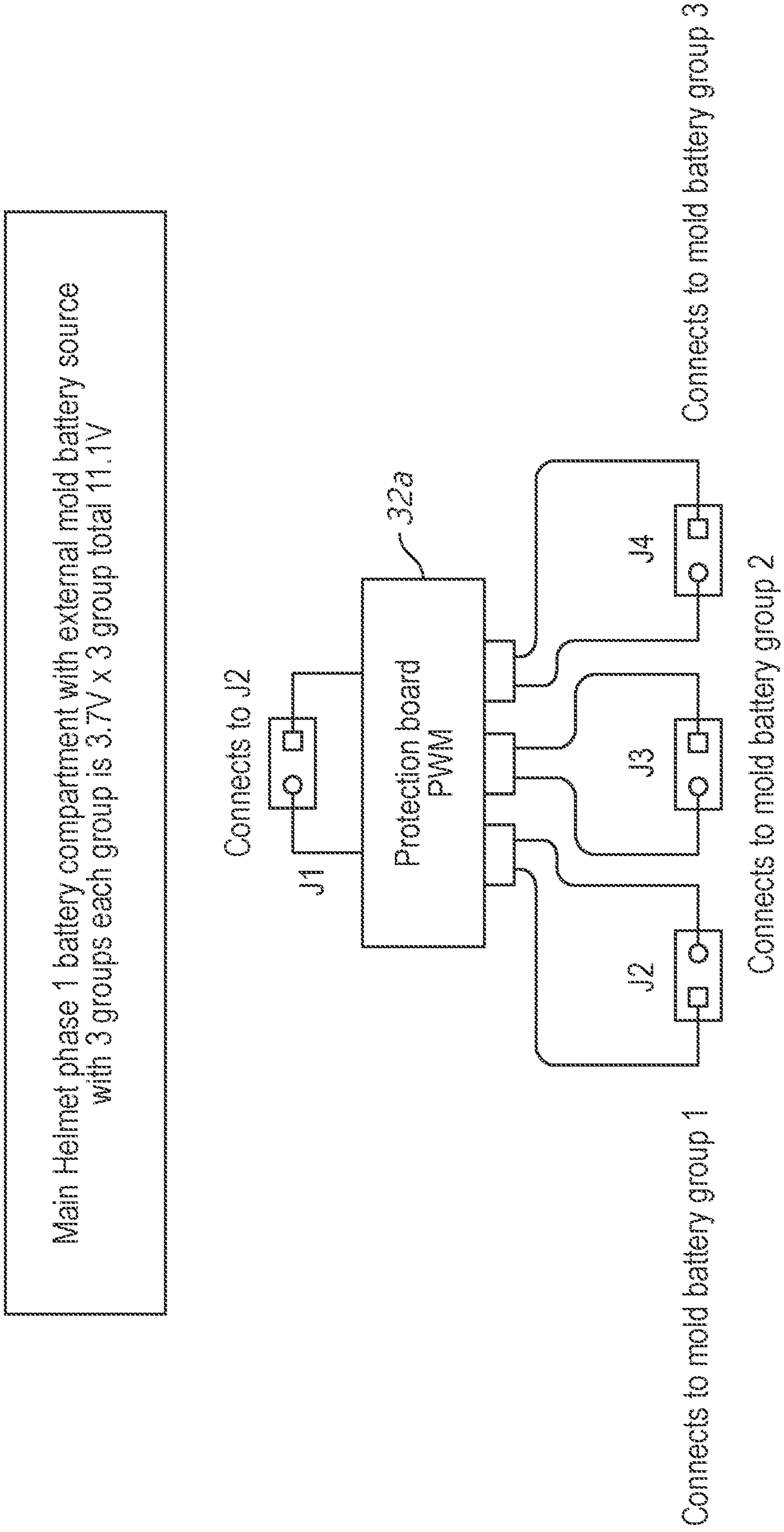
FIG. 10 is a diagram of a portion of the diagram of FIG. 9.

FIGS. 9 and 10 illustrate a wiring diagram for the overall lighting system. The illustrated circuit includes a power source, such as one or more batteries 30, a protection board 32*a*, a strobe microcontroller 32*b*, a switch or button 18 for each light 12, 14, 16, a charger plug 36 and one or more resistors 40, in addition to the lights 12, 14, 16. In the illustrated arrangement, the power source comprises multiple (e.g., three) batteries 30, such as three 3.7V batteries. However, other numbers or types of batteries could also be used, such as those described elsewhere herein or other suitable batteries or power sources.

The strobe microcontroller 32*b* can be configured to control the strobe lights 14 in a manner to reduce power consumption and, therefore, increase battery life. Pulse Width Modulation (PWM) can be used in controlling power output using a microcontroller. The strobe microcontroller 32*b* has many applications, including controlling the power of the lights 12, 14, 16. In the illustrated arrangement, PWM is used to control LED power, including fading out the LED strobe lights 14 for the strobe effect, rather than just turning them on and off. Advantageously, using PWM results in a very low power loss in the switching devices. When a switch is off there is practically no current, and when it is on and power is being transferred to the load, there is almost no voltage drop across the switch. Power loss, being the product of voltage and current, is thus in both cases close to zero. Therefore, utilizing PWM in controlling the strobe lights 14 allows the battery 30 to last longer per charge duty cycle. While it is possible to get PWM controls to work with LEDs using pure guess work, calculating the desired optimum values makes more efficient use of the available processor resources allowing both doing more with the microcontroller and/or controlling more LEDs simultaneously from the same chip.

Figure 11:
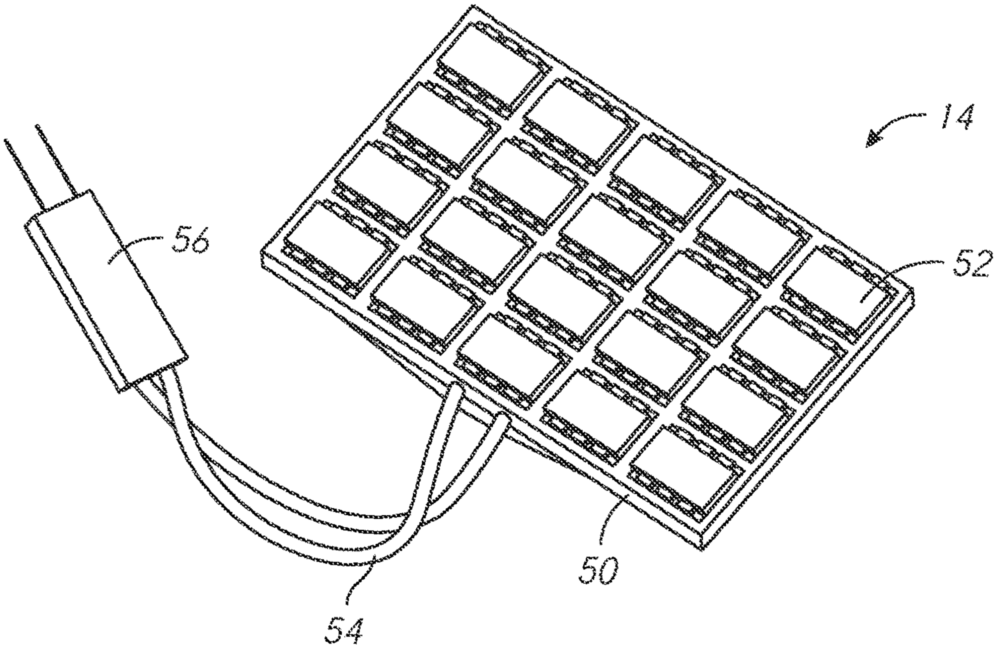
FIG. 11 is a perspective view of the strobe light of the helmet of FIG. 1.
Figure 12:
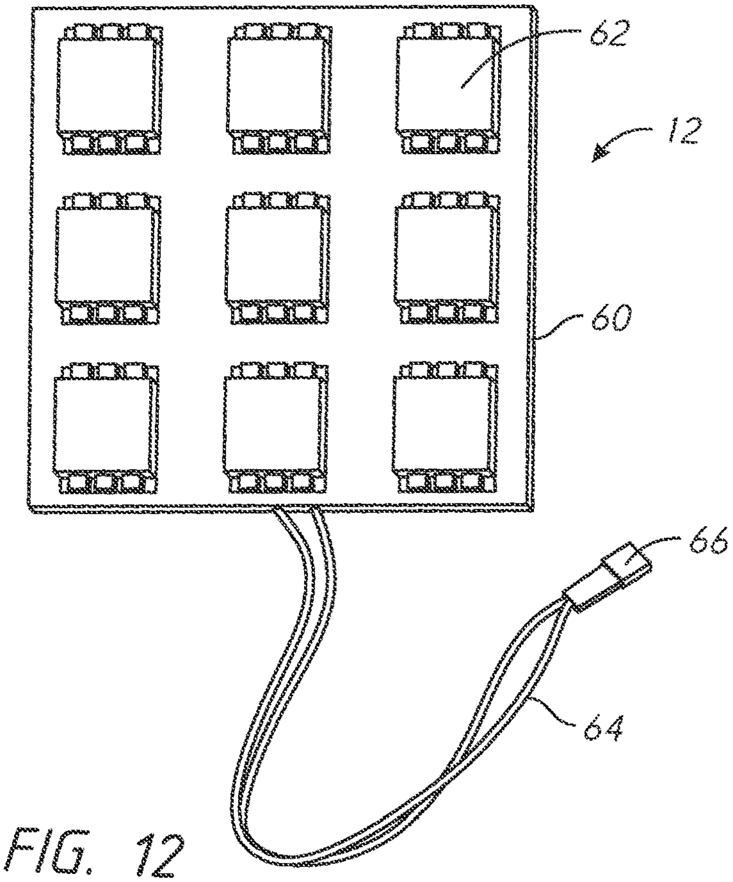
FIG. 12 is a perspective view of the light of the helmet of FIG. 1.

FIG. 11 illustrates a strobe light 14, which comprises a board or substrate 50 that supports a plurality of individual LEDs 52. In the illustrated arrangement, 24 individual LEDs are provided; however, in other arrangements, other numbers of LEDs or other light sources could be used. The strobe light 14 includes electrical wiring 54 and a connector 56 that permits the LEDs 52 to be connected to the electrical circuit of the lighting system. FIG. 12 illustrates a solid light 12, which comprises a board or substrate 60 that supports a plurality of individual LEDs 62. In the illustrated arrangement, nine individual LEDs are provided; however, in other arrangements, other numbers of LEDs or other light sources could be used. The solid light 12 includes electrical wiring 64 and a connector 66 that permits the LEDs 62 to be connected to the electrical circuit of the lighting system.

Figure 13:
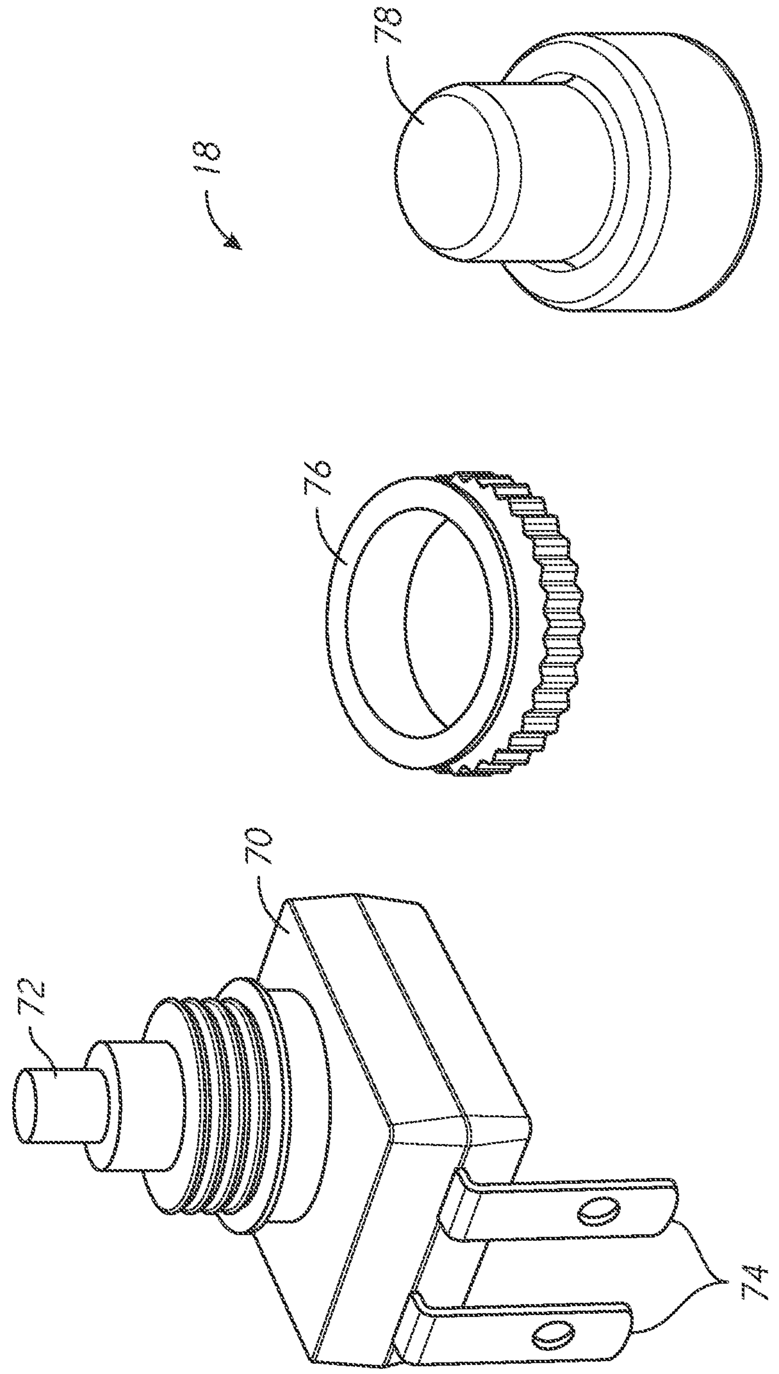
FIG. 13 is a perspective view of a button switch of the helmet of FIG. 1 in an exploded condition.
Figure 14:
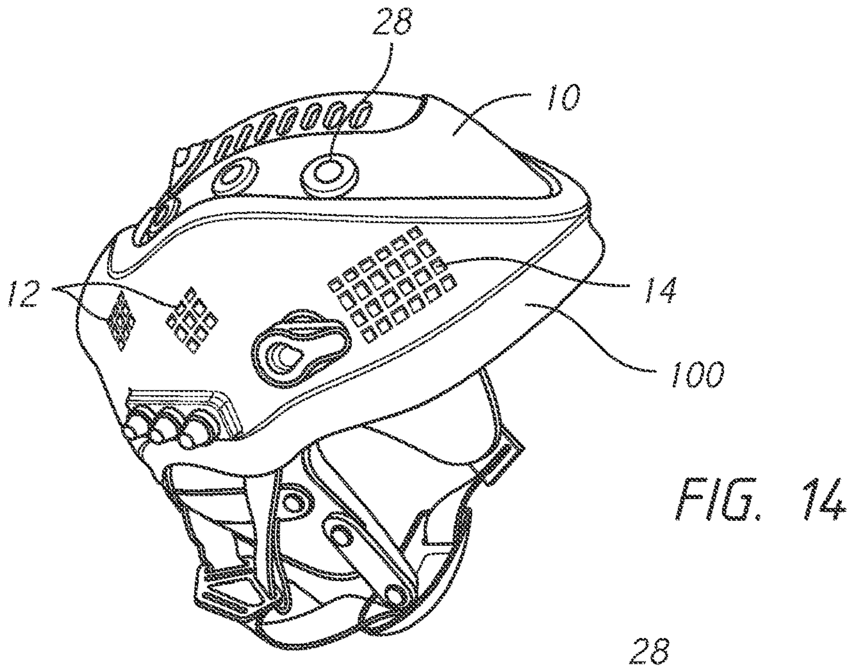
FIG. 14 is a side perspective view of another helmet incorporating a lighting system having certain features, aspects and advantages of the present disclosure.
Figure 15:
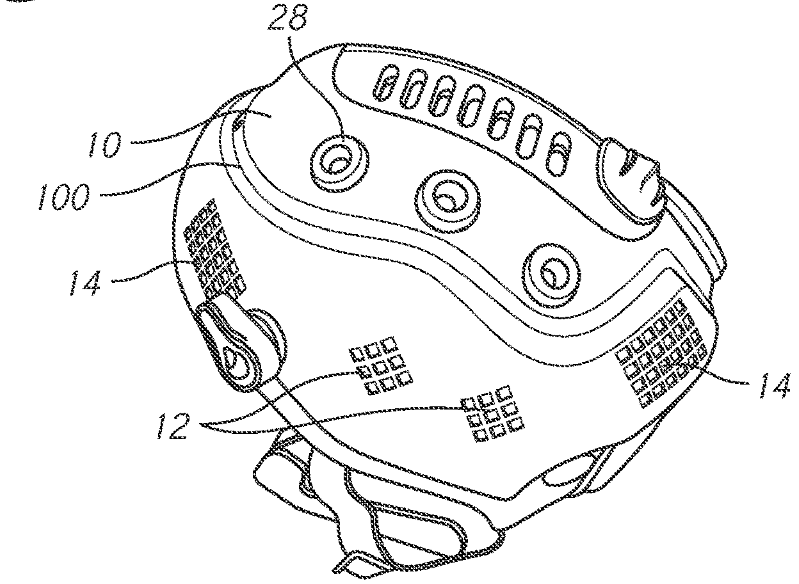
FIG. 15 is another side perspective view of the helmet of FIG. 14.
Figure 16:
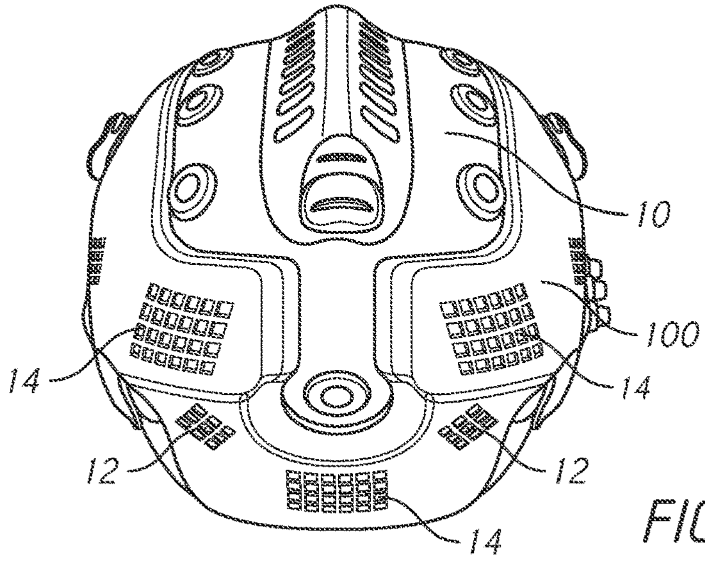
FIG. 16 is a rear perspective view of the helmet of FIG. 14.
Figure 17:
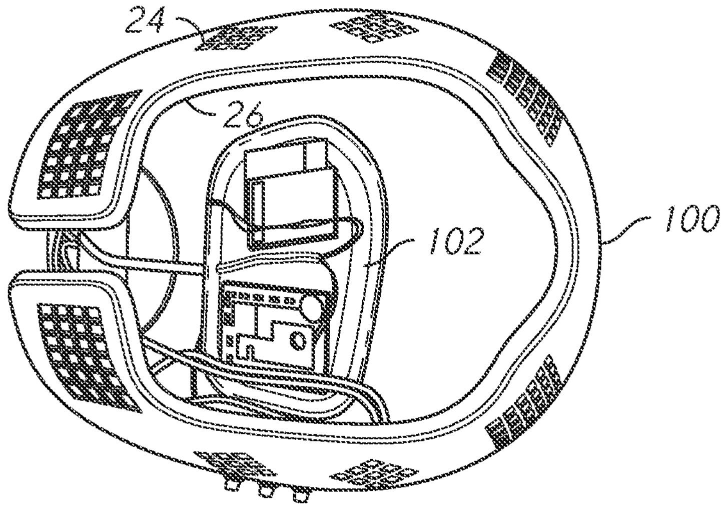
FIG. 17 is a top view of the lighting system of FIG. 14 separated from the underlying helmet.
Figure 18:
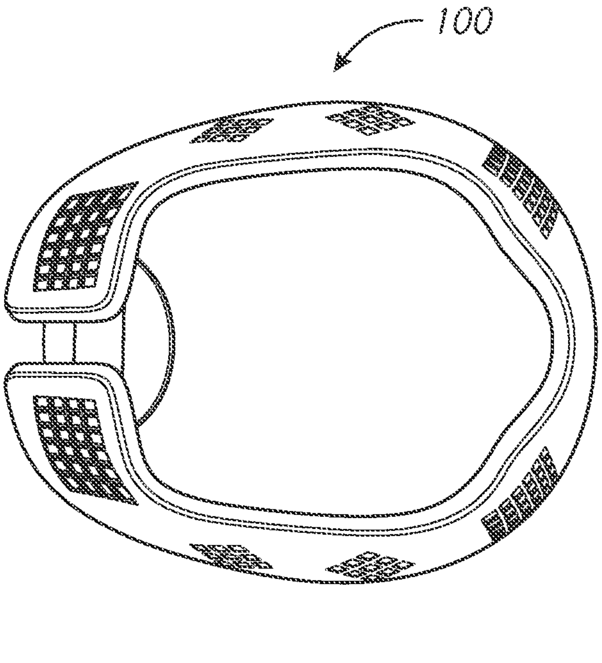
FIG. 18 is a top view of an external portion of the lighting system of FIG. 17.
Figure 19:
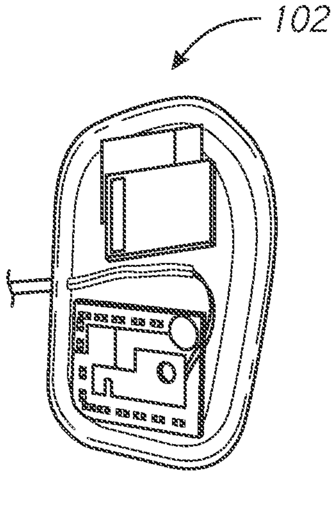
FIG. 19 is a top view of an internal portion of the lighting system of FIG. 17.

FIG. 13 illustrates a switch or button assembly 18 that can be used to activate the lights 12, 14, 16. The button 18 includes a body 70 having a button 72 and electrical contacts or connectors 74. A retaining ring 76 is connectable to the body 70 (such as via a threaded connection) such that the structural shell 20, outer layer 24 and/or inner layer 26 can be received between the body 70 and the retaining ring 76. Accordingly, the button 18 can be coupled to the helmet 10. The button 18 also comprises a cap 78 that can inhibit or prevent water, dirt or other debris from entering the button 72 or other working portions of the button assembly 18.

An example of a lighted helmet 10 and process for constructing the helmet 10 is described below. As described above, in some configurations, a water proof helmet 10 comprises an inner layer 26 and an outer layer 24 that, in some configurations, encapsulate a stock helmet shell 20. In other arrangements, only the inner layer 26 and the outer layer 24 can be provided, at least one of which has the desired structural characteristics of the shell 20 of the helmet 10. In yet other arrangements, a shell assembly comprising the inner layer 26 and the outer layer 24 can be constructed as described below and configured for attachment to an underlying helmet 10. Such a shell can cover an entirety or a portion of the underlying helmet.

The disclosure below is provided in the context of utilizing a stock helmet. However, the helmet 10 can also be constructed from the ground up utilizing one, two or all three of an inner layer 26, an outer layer 24 and a helmet or structural shell layer 20. The first step is to remove all inner linings and padding from the helmet 10. Then, holes are cut in the helmet shell 20 in the desired location of the lights 12 and 14. Preferably, the holes are just big enough to fit the particular light 12, 14, yet sized so that the lights 12, 14 could be glued into place without being too loose in the openings.

The fitting of the lights 12, 14, batteries 30 and electronics 32 is done by any suitable arrangement. For example, the lights 12, 14 are hot glued into the hole openings and the batteries 30 and electronic components 32 are strategically glued into the interior of the helmet shell 20. The lights 12, 14 are brought to the surface of the open holes, but preferably do not protrude significantly further such that the outer layer 24 does not need to be space significantly from the shell 20 to accommodate the lights 12, 14.

A mold is provided to create the outer shell 24 of the helmet 10 (the inner shell 26 is described later). To make the mold, the actual helmet shell 20 is filled with plaster. The outer helmet shell 24 needs to be bigger than the actual helmet so the actual helmet can be inserted into the shell. To hide a seam going across the top of the helmet, it is filled with a filler material (e.g., auto body putty) that hardens and is sculpted to create a smooth appearance on the outer shell 24. When the sculpting was done a layer of ⅛ inch styrene plastic is vacuum formed over the helmet 10 to create the space required between the actual helmet shell 20 and the outer shell 24 required to slide the actual helmet shell 20 into the outer shell 24 as it is being worked on.

At this point the mold was ready for vacuum forming of the outer shell 24. The vent holes in the top of the actual helmet shell 20 were widened to allow room for the vacuum formed vent holes of the outer shell 24 to fit into the helmet 10 for sealing later. The outer shell 24 is vacuum formed in the mold using, for example, 0.090 inch thick PETG (polyethylene terephthalate glycol) sheet material. PETG is a clear thermoplastic material. In some configurations, PETG is selected because of clarity for the lights 12, 24 to shine through and for durability. After the outer shell 24 is vacuum formed, it is pulled off the mold and trimmed to ½ inch beyond the edge of the actual helmet shell 20. The outer shell 24 is left long for later trimming.

In some configurations, before anything else is done, the actual helmet shell 20 is drilled out for three light switches 18, two head lights 16 and the visor 19. In some configurations, the light switches 18 are mounted in line horizontally just behind the front side edge of the helmet shell 20 and the headlights 16 are drilled out at or near the bottom curve of the ear guard. In some cases, the headlight 16 on the right side of the helmet 10 is positioned forward of the light switches or buttons 18. The light switches 18 are glued into the inside of the helmet shell 20 with the button portion of each switch 18 sticking through the wall of the helmet shell 20 and, ultimately, the outer shell 24.

The vacuum-formed clear helmet outer shell 24 is drilled out where the switches 18 line up on the helmet shell 20. Similarly, the position for the headlights 16 will be where holes were drilled in the helmet 20. Two through holes for screws for the headlight assemblies 16 to attach and a through hole for wires from the headlights 16 are drilled for each headlight 16.

The headlights 16 can be off-the-shelf rotating LED lights that get customized. They are disassembled and the stock battery wiring will be replaced by a resistor and long leads that are later fed through the side of the helmet shell 20. The spring assembly that allows the lights 16 to swivel is reworked. The central post on which the final assembly pivots, is cut down so the spring will fit over the post. The existing brass threaded insert is drilled and tapped for a larger screw (e.g., 2-56 threads) so a screw can be installed. This will become the pivot point of the light 16 and will hold the final assembly together.

The electronics inside the customized headlight 16 are waterproofed with urethane, such as Ultralane 780, a product of Specialty Polymers and Services, Inc. of Valencia, CA. Preferably, all wires and connections are covered, as well as the leads of the LED in the front of the case. Caution must be taken to position the wires sticking out so later they can be fed through the hole in the headlight assembly 16. Next, a hole is drilled and tapped ¼ inch behind the pivot screw with 2-56" threads to position the stop screw for the rotation of the headlights 16.

A custom spacer piece **16*a* (FIG. 3) is utilized for mounting the headlights. The spacer can be a black anodized aluminum cylinder that is machined to allow room for the wire to move, room for the spring and a relief. The relief is machined to allow the headlights to rotate 120 degrees and stop at both ends of travel. Next a stainless steel 2-56" socket-head machine screw is inserted into the bottom of the headlight 16 base. This screw will move in the relief slot and produce the stop for rotation of the headlight. A 2-56" nut is turned onto the end protruding into the inner part of the headlight to secure the cap screw. Next the base of the headlight and the custom spacer piece and spring are assembled with another 2-56" machine screw. This screw serves as the pivot for the headlight and holds the headlight and spacer piece together. The wires are fed down through a hole in the bottom part of the headlight and through a hole in the spacer. The spacer also has two 2-56" tapped holes in the outside of the spacer so it can be assembled to the outside of the helmet 10**.

To assemble the headlight assembly 16 onto the helmet 10, in some cases, utilizes three more pieces. Two washers made from soft urethane and a flat washer made of brass. The urethane rubber washers have a hole for the wires that lines up with the hole in the custom spacer and clearance holes for 2-56" screws. The brass outer washer has a clearance hole for 2-56" screws and the wires. After this process, the headlight 16 is ready for assembly onto the helmet 10. One rubber washer is placed between the assembly of the headlight 16 and headlight spacer 16 and the plastic outer shell 24 of the helmet 10. The other rubber washer is lined up on the inside of the helmet 10 and the brass washer is lined up with the holes in the headlight assembly, the outside washer, the helmet, the inside rubber washer and the brass plate. The two wires from the headlight 16 are fed through the holes in all pieces to allow them to be connected to internal electronics later. Two 2-56" screws are inserted through the clearance holes and threaded into the holes in the headlight spacer, these screws are tightened down and the headlight 16 is mounted onto the side of the helmet. This process is repeated for the headlight 16 on the other side of the helmet 10.

After the headlights 16 are secure, the three electronic button switches 18 that control the headlights 16, the green lights 12 and the white flashing or strobe lights 14 are assembled onto the side right side of the helmet 10. The button portion of the switches 18 are fed through the holes in the helmet shell 20 and outer shell 24. The three switches 18 are positioned in the center of their respective holes and fastened together in line to hold their positions while being glued on the inside of the helmet shell 20. The switches 18 are glued in position with a suitable glue or adhesive, such as 3M Scotch-Weld DP 605. This is a tough, polyurethane adhesive that has excellent impact resistance and cures in about 6 hours. The adhesive preferably is suitable to securely hold the buttons 18 from pushing into the inside of the helmet 10 when pressed. At this point the headlights 16 can be soldered to the leads in the wire harness and tested.

Before the inner shell 26 of the helmet 10 is vacuum formed, the headlights 16 and switches 18 preferably are sealed with urethane. This process keeps any water from coming in around the wires or through the buttons 18 or screws. A layer of sealant, such as urethane 780, is applied to the inside of the headlights 16 covering the brass washers, screw heads and the hole where the wires are fed through to the inside of the helmet 10. A bead of material is also applied around the switches 18 that were glued in previously to ensure that area is waterproof.

Next, the headlights 16 and electronic switches 18 are mounted onto the helmet shell 20 and outer shell 24. The outer shell 24 has been trimmed to ⅜ to ½ inch beyond the lower edge of the helmet shell 20 and is ready to have the inside shell 26 vacuum-formed over the internal electronics. In some configurations, the edge of the outer shell 20 of the helmet 10 is covered with aluminum tape to keep it from distorting during the internal shell 26 vacuum form process. A mold is utilized to hold the helmet 10 during this process. This mold holds the helmet 10 inverted so the plastic can be pulled down into the helmet 10. The helmet 10 is placed into the mold and clay is applied between the outer edge of the helmet 10 and the inner edge of the mold. This is to prevent the hot plastic from warping the edge of the outer shell 24 and to shape the edge of the vacuum formed piece for trimming.

Before vacuum forming the plastic into the inside of the helmet 10, the wires are properly positioned or checked for proper positioning so no wires are laying over an area that will expose the wires to an area that will need to be sealed with urethane later. Hot glue can be used to position and hold wires in place during vacuum forming the interior of the helmet 10. The holes to mount the visor 19 have been enlarged to allow for a nut and bolt to hold the visor on. This area will be assisted in the vacuum forming process so the inner shell 26 and the outer shell 24 are actually touching each other. Such an arrangement allows the shells 24, 26 to be sealed together with a sealant (e.g., urethane) and creates a strong, relatively flat surface for the nut and bolt to tighten without creating stress between the layers of plastic. A sheet of, for example, 0.060 inch thick sheet of PETG or other suitable material is then drawn down into the helmet 10 by a vacuum forming process. Excess material around the edge of the inner layer 26 is trimmed off even with the trimmed edge of the outer shell 24, each of which preferably extend beyond the edge of the helmet shell 20. That is, during the vacuum forming process, the inner shell 26 has created a flange that matches up to the outer edge of the outer shell 24. This area is then sealed, such as with a suitable adhesive (e.g., 780 urethane). In other configurations, the edges of the inner shell 26 and the outer shell 24 can be sealed by other suitable processes, such as thermal or radio-frequency welding of the layers 24, 26. In the mold for the outer shell 24 there are deep slots where the water vent holes are in the helmet shell 20. During the vacuum forming of the internal shell 26 it is desirable to make sure the internal plastic shell 26 touches the inside of the external shell 24 at these points. This area is a sensitive area for later sealing with the urethane, other adhesive or other sealing process. Once the inner shell 26 is formed, the headlights 16, wires 34 and switches 18 have been substantially sealed inside the inner shell 26 between the inner shell 26 and the helmet shell 20.

Before the sealing process between the shells 24, 26 begins, the vent holes 28 in the top of the helmet 10 are pre-trimmed. This can be done by cutting a slot through where the inner shell 26 and the outer shell 24 are in contact within the vent holes 28. This operation creates the vents to later be widened a bit after sealing and creates a place where the 780 urethane or other sealant can be squeezed in between the inside shell 26 and the outer shell 24 to seal the vent holes 28 of the helmet 10.

In some configurations, the perimeter of the inner shell 26 and the outer shell is sealed, such as by using an adhesive or other method to join the shells 24, 26 to inhibit or prevent entry of water or other foreign material between the shells 24, 26. In some configurations, before mixing the A and B portions of the 780 urethane (for example and further references herein are also intended to cover other suitable sealants), a thickening additive, such as a fumed silica (also known as pyrogenic silica) sold under the tradename CAB-O-SIL®, is added to the mixture to make it less viscous. By thickening the mixture, the urethane doesn't run into the areas of the helmet 10 where it is not necessary. A needle syringe or other suitable applicator filled with the 780 urethane (for example) mixture and is inserted between the edges of the inner shell 26 and the outer shell 24 where they come together (e.g., at the edges of the helmet 10 and within the vents 28).

As material is squeezed out of the syringe, it is dispensed along the outer edge of the helmet 10. After the outer edge is sealed, the vents 28 are sealed—or vice-versa. The needle bottle, syringe or other applicator tip is inserted between the inner shell 26 and the outer shell 24 openings at the vents 28 and the 780 urethane is inserted watching to make sure the urethane is continuous along the perimeter of the vent 28 (or edge) such that it creates a seal. After material is inserted inside the helmet vents 28, a bead of 780 urethane is applied around to individual vents 28 on the outside of the holes further sealing the inner shell 26 and the outer shell 24 at the vent holes 28. In some configurations, the last area to be sealed is the button switches 18. A very thin bead of 780 urethane (for example) is applied around the outside of the buttons 18 to assure the rubber covers (78-FIG. 13) are sealed.

After allowing time for the urethane to set properly, preferably for a minimum of 24 hours, final assembly can begin. Three black vinyl rings (76-FIG. 13) are applied around the three button switches 18. Black vinyl edging 29 (for example) is applied around the perimeter of the helmet 10. Velcro is attached to the head padding and to corresponding locations on the inside of the helmet 10 to affix the padding to the helmet 10. Other suitable methods can also be used.

Once trimmed, the location for the lights 12, 14 mounted into the helmet shell 20 are identified from the outside of the clear, vacuum formed outer shell 24. This is done by placing tape around the lights. Next the area of the lights 12, 14 is masked off on the inside of the tape that designates the internal space for the lights 12, 14. The reason for this step is because the inside of the helmet 10 can be painted black or another dark color and the areas where the lights 12, 14 shine through on the outer layer 24 preferably remain clear.

The above-described process is in the context of a prototype or relatively low volume manufacturing environment. However, in higher volume manufacturing scenarios, the process can be modified as appropriate, such as by replacing vacuum molding of the shells 24, 26 with injection molding.

Shell Mounted to Helmet

As described above, the lighting system can be in the form of a shell or module 100 that attaches to an underlying helmet 10. FIGS. 14-19 illustrate a helmet 10 having a lighting system shell or module 100 coupled thereto. The shell 100 covers a portion or an entirety of the underlying helmet 10. In the illustrated arrangement, the shell 100 wraps around an entire circumference of the helmet 10, but leave at least portions of the underlying helmet 10 exposed. For example, a top center portion of the helmet 10 containing vents 28 can be left exposed.

The shell 100 comprises an outer layer 24 and an inner layer 26 encapsulating lights (and related electrical components, such as those described above with respect to the integrated system) that sits on the exterior of the helmet 10. The shell 100 can be self-contained. In some configurations, the lights, wiring, buttons or switches and headlamps are contained within or directly supported by the shell 100. However, not all of the components are necessarily contained within or directly supported by the shell 100 that is on the exterior surface of the helmet 10. For example, in at least some configurations, an auxiliary shell 102 contains one or more of the battery(ies) 30, circuit board 32 or other components of the lighting system. The auxiliary shell 102 can be connected to the outer shell 100 by wiring 34. Preferably, each of the shells 100, 102 and the wiring 34 is sealed to substantially inhibit or prevent the ingress of water. The auxiliary shell 102 can be positioned on an interior of the helmet 10 and connected to the outer shell 100 by the wiring 34. In some configurations, the auxiliary shell 102 can be positioned underneath the rear pads or other interior liner of the, e.g., search and rescue, helmet. The system can be packaged and shipped in this way, with the outer shell 100 and auxiliary shell 102 coupled by wiring 34, and ready for application to the helmet 10.

As illustrated, the helmet cover assembly or shell 100 can comprise a plurality of LED lights 12, 14, controllers or circuit boards 32 and batteries 30 wired together and encapsulated inside two layers (e.g., outer and inner layers 24, 26) of, for example, a flexible plastic film for water-tight containment. The assembly may also have encapsulated between the two layers of flexible plastic film, a foam layer or padding layer around the lights and batteries to act as a cushion for the helmet. The foam layer or padding layer in conjunction with the encapsulated film structure 100 may provide the helmet cover assembly with buoyancy when placed in water.

As discussed, the helmet cover assembly is sized and shaped to wrap around the contour of the helmet and can be attached to the helmet by any suitable arrangement, such as adhesives, hook/loop fasteners, snaps, clips, clamps or other attachment devices. For example, one or both of the shells 100, 102 can include an adhesive layer that permits the shell 100 or 102 to be adhered to the helmet 10. Other suitable methods of attachment can also be used.

The helmet shell assembly 100 can be made of colored plastic film or silk screened film in order that the lights 12, 14 will only be emitting in specific areas. In some configurations, a sheet material that forms the outer layer 24 of the shell assembly 100 can be printed/silk screened to define the light emitting areas in a flat configuration and then formed into a desired shape. The outer layer 24 of plastic film may be formed (through vacuum forming or thermoforming or other process) to the contour of the LED lights, wires and batteries.

A battery charger connector 36 plug may extend outside the encapsulated film in order to allow charging of the batteries. The charger connector 36 may be associated with either one of the shells 100, 102.

The LED lights 12, 14, circuit boards 32 and/or batteries 30 may be attached to the inner layer 26 of plastic film by, for example, adhesives or adhesive pads.

Light System

In some configurations, a light system 200 comprises light pods 202 and/or light strips 204 that can be applied to an underlying helmet 10 at any desired location(s). Such an arrangement can provide a cheaper alternative to the above-described arrangements, or can be used with helmets 10 that are more difficult to apply the lighting shell 100. In some configurations, there are self-contained strips that have a length, such as 15 inches for example, or can be cut to match any size helmet. In one configuration, the system includes packaging containing, for example, one or more (e.g., six-nine) oval lights or pods 202 and, for example, one or more (e.g., four-seven) strips 204. The lights can be powered by a suitable power source, such as a 12 V battery or other power source. The system can come with a 12 V charger.

Figure 20:
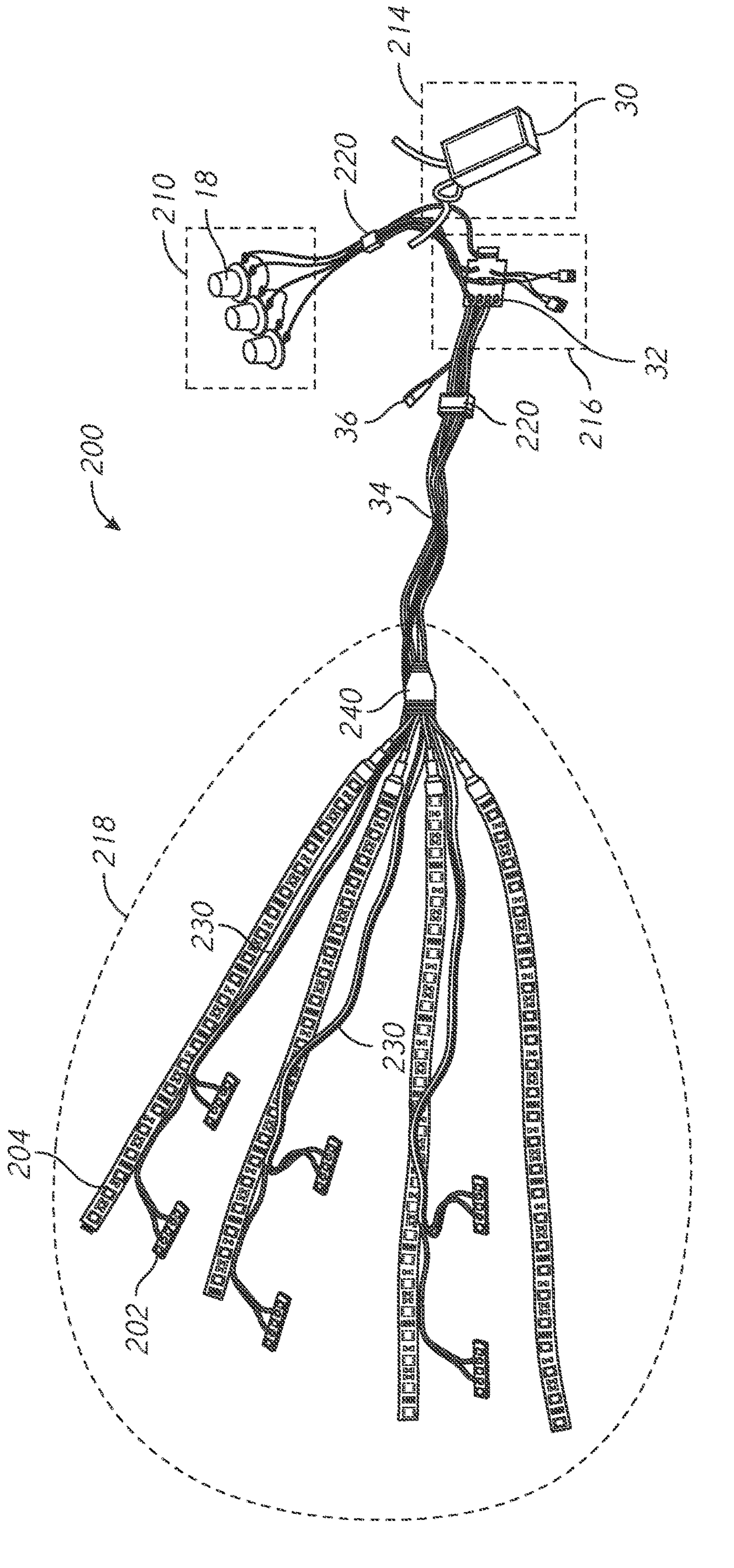
FIG. 20 is perspective view of a lighting system having certain features, aspects and advantages of the present disclosure.

FIGS. 20-23 illustrate a light system 200 and the light system 200 applied to a helmet 10. With reference to FIG. 20, the light system 200 comprises any desired or suitable number of the light pods 202 and light strips 204. The system 200 can include one or more batteries 30 or other power sources, one or more controllers or circuit boards 32 and one or more (e.g., three) buttons 18. These or other components can be connected by any suitable electrical wiring 34 or other electrical connector. The system 200 can operate in a manner similar to those described above or further below with respect to the specific wiring diagram.

Preferably, the system 200 include one or more enclosures for components of the system 200, such as the light pods 202, light strips 204, buttons 18, batteries 30 and circuit boards 32. Preferably, the enclosures are water resistant or water proof. In other words, the enclosures can substantially inhibit or prevent the ingress of water for a desired or an acceptable operational period for the particular application. In some cases, the enclosures may be fire and/or impact resistant, as well.

In the illustrated configuration, the system 200 includes an enclosure 210 for the buttons 18. The button enclosure 210 can comprise a housing, such as an injection or otherwise molded plastic or elastomeric housing, for example. The button enclosure 210 can be formed in multiple pieces and assembled over the buttons 18 or can be overmolded or otherwise integrated with the buttons 18. The button enclosure 210 can be attached to the helmet 10 at any suitable location, such as affixed to the helmet shell 20 or straps 212, for example.

The system 20 also comprises enclosures 214, 216 for the battery(ies) 30 and the controller or circuit board 32, respectively. If desired, the controller or circuit board 32 and the battery(ies) 30 can be enclosed within a single enclosure. The enclosures 214, 216 can be housings, similar to the enclosure 210. In other configurations, the enclosures 214, 216 are formed by molding a water resistant, water proof, fire resistant and/or impact resistant material over the controller or circuit board 32 and the battery(ies) 30 to encase the controller or circuit board 32 and the battery(ies) 30 in the water resistant, water proof, fire resistant and/or impact resistant material.

The light pods 202 and light strips 204 are also enclosed in an enclosure 218, which preferably is a water resistant or water proof material that is molded or otherwise formed over the light pods 202 and the light strips 204. In some configurations, the material of the enclosure 218 is a clear and flexible urethane or silicone. In some configurations, the material may also be water, fire and/or impact resistant such that the system 200 can meet the standards for fire and rescue helmets.

Figure 22:
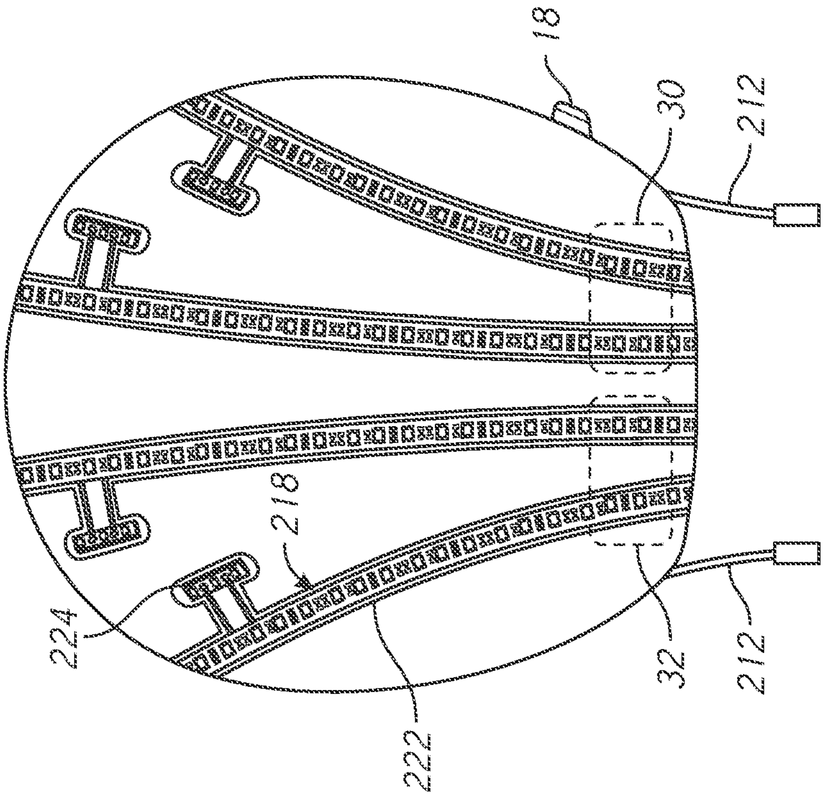
FIG. 22 is a rear view of the helmet and lighting system of FIG. 21.
Figure 21:
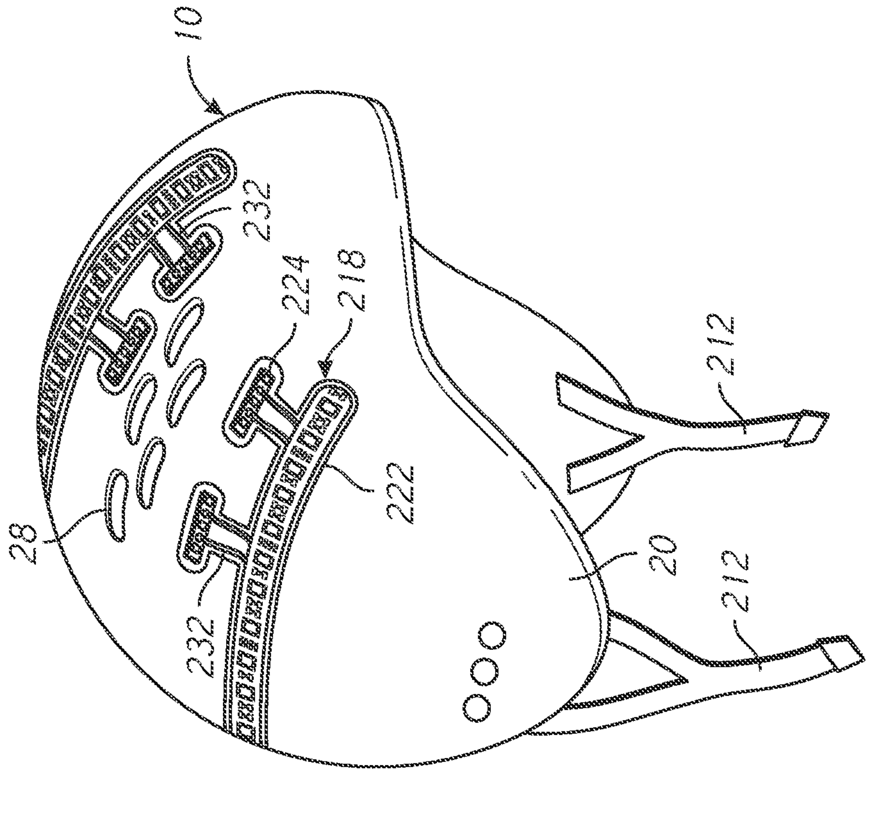
FIG. 21 is a side perspective view of the lighting system of FIG. 20 assembled to an underlying helmet.
Figure 23:
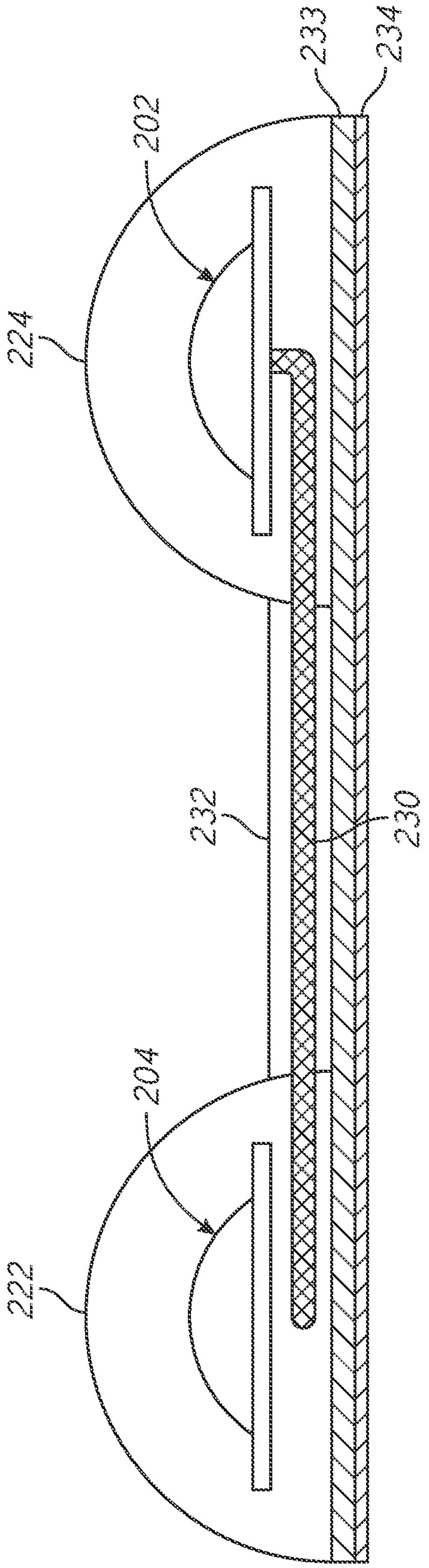
FIG. 23 is a side view of a portion of the lighting system of FIG. 20.

The enclosure 218 for the light pods 202 and light strips 204 can take on any suitable size or shape. For example, FIG. 20 schematically illustrates the enclosure 218 as a single large enclosure that encapsulates all of the light pods 202 and light strips 204. However, in other configurations, as illustrated in FIGS. 21-23, the enclosure 218 can have multiple portions, each of which are relatively the same shape as the individual light pods 202 and light strips 204. The multiple portions can be connected to one another, such as at a base of the light pods 202 and light strips 204.

As illustrated in FIG. 20, the various enclosures 210, 214, 216, 218 can be interconnected by electrical wiring 34 and/or other suitable connecting structures (e.g., non-electrical wires or cables). The exposed portions of the wiring 34 can include connectors 220 that permit separation of the portions of the wiring 34 such that the enclosures 210, 214, 216, 218 (and components contained therein) can be separated from one another at the connectors 220. Additional connectors 220 can also be provided depending on which enclosures 210, 214, 216, 218 or other structures are desired to be capable of separation. Such an arrangement can facilitate shipping by allowing the system 200 to be broken down or can facilitate replacement of individual portions of the system 200 in the event of damage or failure.

With reference to FIGS. 21 and 22, the system 200 is illustrated as attached to an underlying helmet 10. The light pods 202 and light strips 204 provide the flexibility to be positioned where desired and avoid features of the helmet 10, such as vents 28, for example. Thus, at least the enclosure 218 is flexible so that the light pods 202 and light strips 204 can be routed as desired along the exterior surface of the helmet 10. For example, the enclosure 218 can be curved to allow at least the light strips 204 to be curved. The light strips 204 can be cut to a desired size. Because the light strips 204 are encapsulated in the enclosure 218, the light strips 204 and the system 200 can remain water resistant or water proof despite the cutting of the light strips 204. In addition, portions of the enclosure 218 containing the light pods 202 can be positioned as desired. The enclosure 218 can include elongate portions 222 that encapsulate the light strips 204 and pod-like portions 224 that encapsulate the light pods 202. The pod-like portions 224 can take on any desired shape, such as oval, circular, square, star or other geometric shapes. The pod-like portions 224 could also take on more intricate designs, such as dragons or other animals or creatures.

The electrical wiring 230 leading to the light pods 202 can be encapsulated in a separate elongated portion of the enclosure 218 that extends to pod-like portions 224 containing the light pods 202. In other configurations, as shown FIGS. 21 and 22 and, more particularly, in FIG. 23, the wiring 230 can extend underneath the light strips 204 along a portion or a substantial entirety of the light strips 204. The wiring 230 can extend out from under the light strips 204 through runners 232 of the enclosure 218 to the light pods 202. The runners 232 can be flexible to allow a position of the light pods 202 to be adjusted relative to a lengthwise direction of or along a length of the light strips 204. FIG. 23 illustrates a base layer 233 and an adhesive layer 234. The base layer 233 can be relatively dark in color (e.g., black) to hide the wiring 230 and enhance the visibility of the light strips 204 or light pods 202. The upper portion of the enclosure (e.g., at least the portion over top of the LED or other light sources of the light strips 204 and light pods 202) can be clear to enhance transmission of light from the light strips 204 and light pods 202. In other configurations, the portion of the enclosure over the light sources can be colored; however, preferably, the color is selected such that the light sources are visible. The adhesive layer 234 allows the portions 222, 224, 232 of the enclosure 218 to be attached to the exterior surface of the helmet 10.

In the illustrated arrangement, the light strips 204 are interconnected at a junction 240 (FIG. 20). If desired, the wiring 230 to the light pods 202 could also be interconnected at the junction 240, at a separate junction or, as illustrated, can extend separately to the connector 220. The enclosure 218 can enclose the junction 240. In some configurations, the elongate portions 222 of the enclosure that encapsulate the light strips 204 can meet at and be physically interconnected by a portion of the enclosure 218 that encloses the junction 240. The wiring 230 leading to the light pods 202 can also meet at and be encapsulated by the portion of the enclosure 218 that encloses the junction 240. Alternatively, the wiring 230 and light pods 202 can be completely separate from the light strips 204, which can provide additional freedom of positioning of both the light pods 202 and the light strips 204.

Figure 24:
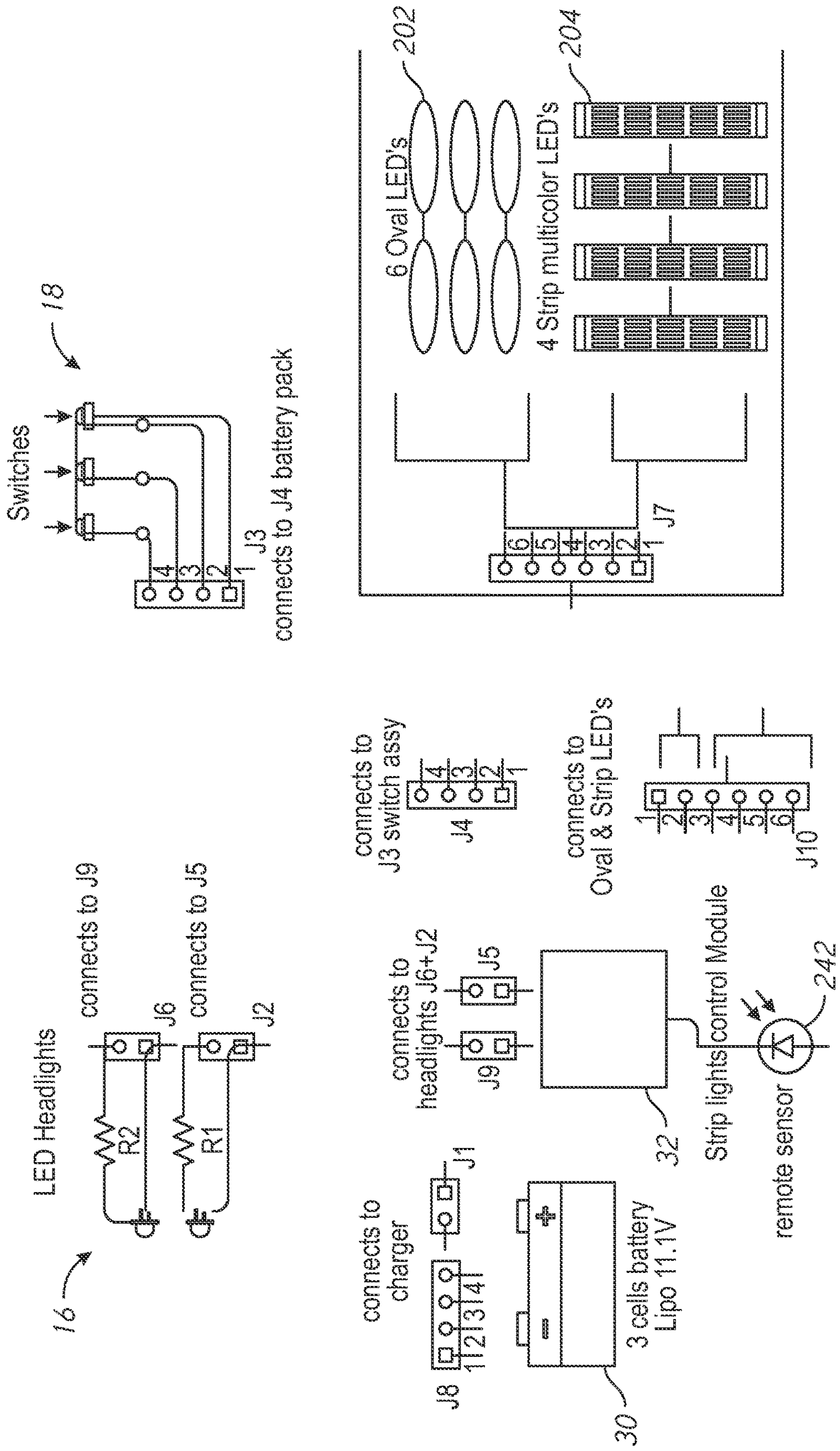
FIG. 24 is a diagram of the lighting system of FIG. 20.

FIG. 24 illustrates a wiring diagram for the system 200. The wiring diagram is substantially similar to the wiring diagrams of the prior arrangements. In the illustrated configuration, the batteries 30 are three LiPo batteries having a total of 11.1V. The controller or circuit board 32 is a control module for the LED light strips 204. The light strips 204 can be commercially available uncoated LED light strips that are encapsulated as described above. The light pods 202 can contain one or more (e.g., three) LED lights preferably supported on a base or substrate and encapsulated as described above. Although not specifically shown in FIGS. 20-23, the system 200 can also include one or more headlights 16, which are illustrated in the wiring diagram of FIG. 24. FIG. 24 also illustrates a remote sensor 242 that is configured to receive control signals from a remote control. The control module 32 communicates with the remote sensor 242 to receive the remote control signals.

Manufacturing of Light System

In an example of a procedure for manufacture of at least a portion of the accessory lighting equipment system 200, one or more components or portions of the lighting apparatus 200 are encapsulated within an enclosure 210, 214, 216 or 218 configured such that the system 200 and underlying helmet 10 is suitable for use in fire-fighting or other rescue equipment applications. As described above, the system 200 comprises several components that make up an illumination system designed, in some configurations, to identify or indicate the presence of the wearer to other persons, as well as provide supplemental lighting for the wearer.

One design specification of an embodiment of the system 200 is the protection of the components from the harsh elements that the users would likely experience in the performance of their duties. In some configurations, the system 200 is designed to be resistant to one or more of water and moisture, chemicals, heat, flame exposure and impact.

Each of the main components of the system is encased in an enclosure 210, 214, 216 or 218, which can be a urethane rubber material. In some configurations, this material is Ultralane 722 A/B from Specialty Polymers and Services of Valencia, CA. Ultralane 722 is a water-clear urethane based rubber with a Shore A hardness of about 75 when fully cured. The components (A/B) of the rubber are mixed according to manufacturer's instruction at a ratio of 1:1 by weight or volume. In order to achieve colored castings, the SO-STRONG and UVO family of pigments and dyes from Reynolds Advanced Materials, North Hollywood, CA can be used, for example. The ratio of dyes and pigments vary according to the amount of material being mixed and the color desired. Since the above-identified urethane rubber is water clear, the color is adjusted by sight during the mixing process to achieve the desired tone, as the curing process of the rubber does not significantly alter the color.

Preferably, each lighting component is full assembled, wired and tested for proper operation, as described above. A form is created that will produce the final desired shape of the component (e.g., light pod 202 or light strip 204) once fully encapsulated. A tooling mold is made from the form to create a cavity that will accept the completed component. The silicone rubber mold is cured and the tooling form is removed. In other configurations, the tooling mold can be made without a form. For example, the mold can be machined in accordance with a CAD model of the component. In such an arrangement, the tooling mold can be made from a suitable material, such as aluminum. In some cases, the tooling mold may have a minimum of 1/16th of an inch of additional clearance.

In some configurations, the enclosure 210, 214, 216 or 218 is constructed as a single, unitary structure or by a single pour or injection into the mold. In such a configuration, the component can be suspended by any one of a variety of suitable means to center the component within the mold without touching the sides. Part B of the Ultralane urethane rubber is weighed out, dyes and pigments are added to areas where color and opacity are required. If component is to remain clear, the mixture is used as-is. Part A is added in a 1:1 ration AB mix. The material is mechanically mixed and then vacuum degassed to 29 inHg as per manufacturer's recommendations. The resulting degassed mixture is poured into the mold such that it surrounds the component. The assembly can then be left to cure for an appropriate period of time at an appropriate temperature (e.g., 2 hours at room temperature). The component and enclosure 210, 214, 216 or 218 assembly can be post-cured in a curing oven for an appropriate period of time at an appropriate temperature (e.g., a minimum of 2 hours at 100 Degrees F.). The assembly can be cooled at room temperature for 24 hours to achieve final properties.

Preferably, special attention is paid to the creation of the mold tools used in areas where clear/translucent properties are desired, such as in the areas from which lights will be emitted. The surface should be very clean and/or shiny in order for the clarity of the rubber to be suitable or optimum. Care preferably should be taken with respect to switches and moving components to adjust for the density of the urethane rubber in areas where buttons 18 must be operated through the rubber encapsulate in order that the function of the switches are not impaired. In areas where mobility and flexibility is desired, testing should be done to ensure that the rubber allows adequate flexibility. In some configurations, the buttons 18 can be partially exposed from the rubber encapsulate as long as a seal is maintained to an appropriate level for the desired application.

Preliminary testing indicates that the Ultralane 722 urethane rubber will protect the interior components, when properly encapsulated, from water, and the rubber will not deform or self-ignite in tested levels of heat sufficient to meet rescue and fire helmet standards. The fully encapsulated component, cured as described, was submerged in 24 inches of plain tap water at room temperature for 48 hours. Sample was removed cloth-dried on the exterior and cut open. No moisture was readily apparent. A 2" cube of Ultralane 722 that was properly cured was placed on a wire metal rack inside a small oven. The oven was preheated to 500 degrees F. The cube was placed in the oven for 5 minutes. Sample removed and cooled. Sample exhibited a slight amount of discoloration around the edges. Sample remained in its original shape and did not auto-ignite under these testing conditions. The sample also did not auto-ignite when exposed to direct flame.

Figure 25:
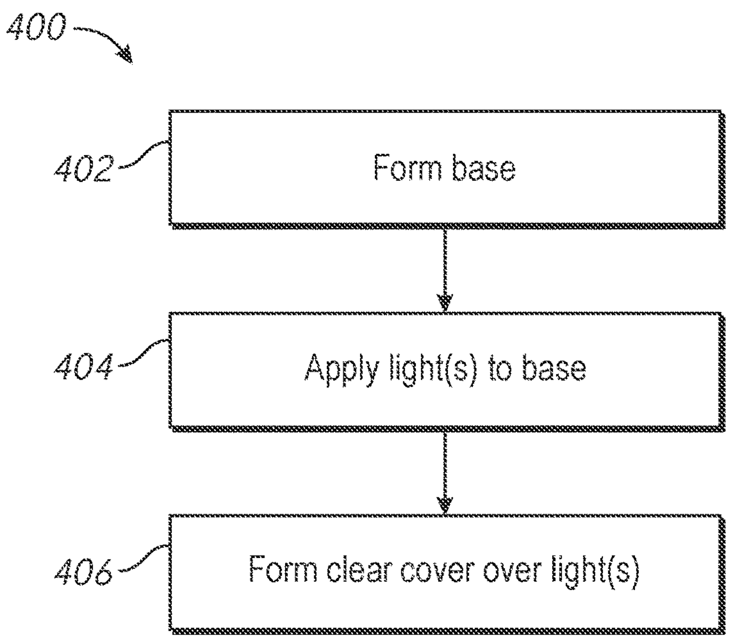
FIG. 25 is a block diagram of a process for manufacturing a portion of the lighting system of FIG. 20.

In other configurations, the enclosure can be constructed in two (or more) parts or layers, or by two (or more) pours or injections into a mold by a process 400. Such a process 400 is described with reference to FIG. 25 for a light pod 202 or light strip 204. However, the procedure can apply to other components of the system 200 and other enclosures 210, 214, 216 or 218. With reference to block 402, the dark or black tray element 233 (bottom surface portion of pod or strip lights 202, 204) is formed. For example, in one configuration, the mold cavities can be cleaned thoroughly with solvent and dried. A liberal, even coat of Ease-Release 2300 or other mold release can be applied to both surfaces of mold. In clean separate containers, a suitable amount (e.g., 30 grams) of both part A and Part B of S&S Ultralane 722 or another suitable material can be mixed. In Part B of the urethane material, a suitable amount (e.g., 1 gram) of a Silpak Black UD Dye or another suitable dye or colorant can be added and mixed thoroughly. Part A can be added to Part B and the combination can be mixed for a suitable amount of time, such as at least about 30 seconds, until the combination is well mixed.

In some configurations, the mixture can be placed into a vacuum chamber for 1-3 minutes or until mixture has fully risen and fallen and majority of bubbles have been evacuated. The mixture can be removed from vacuum and poured slowly and evenly into the mold until the material fills the base, such as approximately 1/8" full. A top or impression strip can be placed into the mold on top of the urethane material with one edge angled higher than the other to inhibit or prevent bubbles from becoming trapped underneath. Material may flow out into vents and possibly over the edges of the mold. Once the top is properly positioned, it can be secured in place. Excess plastic can be wiped from the edges of the mold where it has seeped out. The mold with the mixture can be placed into a drying oven for a suitable period of time (e.g., 4-6 hours) at a suitable temperature (e.g., 110 degrees) to assist in curing. Once fully cured, such as about 8-10 hours, the formed base 233 can be carefully removed from the mold. If necessary, excess flashing can be trimmed using scissors and/or a utility knife to form even, clean lines. Preferably, the base 233 is cleaned, such as with a 99% alcohol cleaner, to substantially or completely remove any mold release.

The second stage of the casting is the clear or at least partially transparent lens section (the upper portion of the strips 204 and pods 202). In summary, a suitable material (e.g., clear urethane) is poured into the mold with the black or other dark colored base 233, over and onto the LED light strip 204 or pod 202. The two sections will bond creating a durable, resistant assembly with the LED's completely encapsulated.

In some configurations, the base 233 is mounted into the mold using, for example, ½" double sided tape. Using the included adhesive or an applied adhesive on the LED strip 204 or pod 202, mount the LED strip light 204 or pod 202 onto the base 233, as illustrated at block 404. In some configurations, the wires 230 will protrude from an edge of the mold configured to accommodate the wires 230. It can be verified that the strip 204 or pod 202 is firmly adhered and flat to the base 233, without any curling or gaps present.

The exposed surfaces of the mold can be cleaned using, for example, a 99% alcohol solution or another suitable solvent. If desired, the mold can be sprayed to coat with a mold release product, such as ER 2300 mold release. A mixture of a suitable amount (e.g., 30 grams) of each of Part A and Part B of the Ultralane urethane plastic, or another suitable material, can be prepared as described above. However, in at least some configurations, the mixture is prepared without dye, taking care to not entrap bubbles. In some configurations, the mixture can be prepared with a dye or other colorant to produce a colored part. However, preferably, the color is selected such that the resulting enclosure 218 is at least partially transparent such that light can be transmitted from the light strip 204 or light pod 202.

As illustrated at block 406, the mixture can be poured, injected or otherwise introduced into the mold over the base 233 and light strip 204 or light pod 202. The mixture can be allowed to stand a sufficient amount of time (e.g., 8-10 minutes) such that the assembly is cured enough to remove from mold. This standing time can be at room temperature without added heat. Flashing can be trimmed, if needed. The entire part can be cleaned with a suitable cleaner (e.g., a 99% alcohol solution) to remove substantially all mold release. The functioning of the light strip 204 or light pod 202 can be tested to verify that strip light is operating correctly. The assembly (enclosure 218) can be assembled to other components of the system 200, such as the components illustrated and described in connection with FIG. 20.

In the manufacture of the enclosure 218, or other enclosures 210, 214 or 216, care should be taken to ensure bubble free castings (assuming poured moldings). Time under vacuum can vary depending on vacuum pump specifications and chamber size. With experience, a more defined measurement of the urethane mixture could be determined so the proper level with no overspill can be made consistently. In some configurations, finished pieces can be left in flat position to fully cure for a suitable period of time (e.g., 72 hours) to reach final performance specifications. The steps, times, temperatures, amounts and other specifics described above are exemplary in the context of the disclosed embodiment(s) and can be changed depending on the particular manufacturing method employed. Not all of the steps described above are necessary in all configurations—some may be optional. The steps do not necessarily need to be performed in the order listed above. Ultralane 722A/B is a presently preferred urethane casting resin available from SP&S, Valencia, CA This material is preferred because it is clear and has other desirable properties, such as fire/flame, impact and chemical resistance. Other suitable materials can also be used. References to Ultralane herein are exemplary and such references can be replaced with another suitable material.

Figure 26:
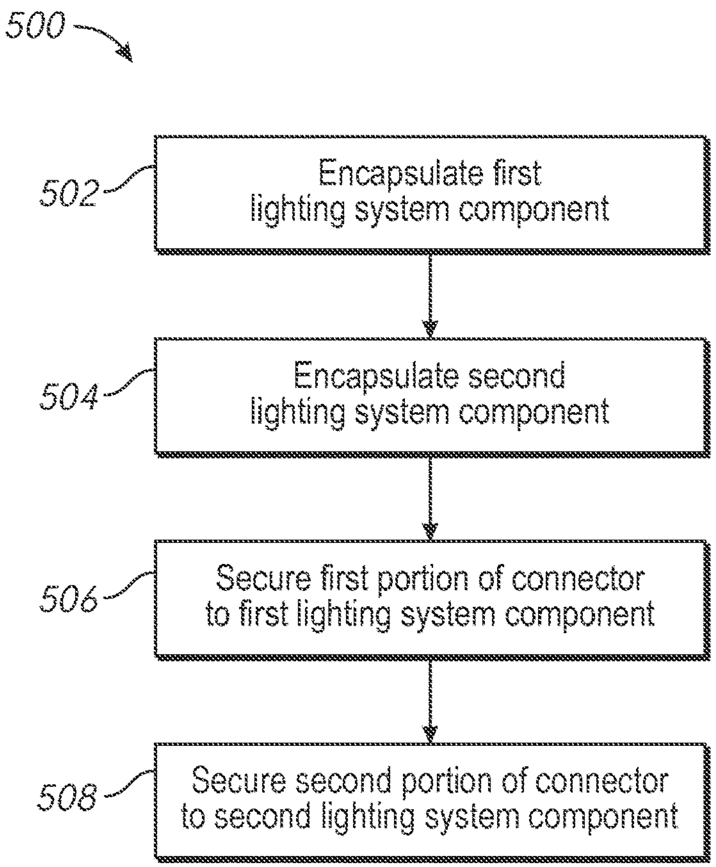
FIG. 26 is a block diagram of a process for manufacturing a portion of the lighting system of FIG. 20.

With reference to FIG. 26, a system 200 as illustrated in FIG. 20 can be manufactured by a process 500. The process 500 can include encapsulating a first component of the lighting system 200, such as by the process described above and in connection with FIG. 25, as illustrate at block 500. The first component (or any other component described herein) can be one or more light strips 204 or light pods 202, or can be other components of the system 200, such as switches/buttons 18, one or more batteries 30 or one or more controllers 32. A second component can similarly be encapsulated in an enclosure 210, 214, 216, 218, as illustrated at block 504. The first component can have a first portion of a connector 220 attached (e.g., physically and electrically connected), as illustrated at block 506. Similarly, the second component can have a second portion of a connector 220 attached (e.g., physically and electrically connected), as illustrated at block 508. As a result, the first component and the second component can be secured together (e.g., physically and electrically connected) by securing together the first and second portions of the connectors 220, which can be done during manufacture or later by a consumer or end user.

Batteries

The helmet includes batteries to power the lights and/or any other accessories of the helmet that require electrical power. In some configurations, the batteries 30 comprise a plurality of thin, flat batteries that can be encapsulated between the inner and outer sealing layers of the helmet assembly (or between inner and outer layers of a helmet add-on system as described below). For example, the batteries can comprise a plurality of wearable technology 2014 curved lithium battery 3.7 v 580 mAh Part No. PL233080R available from Shenzhen Polinovel Technology Co., Ltd.

Figure 27:
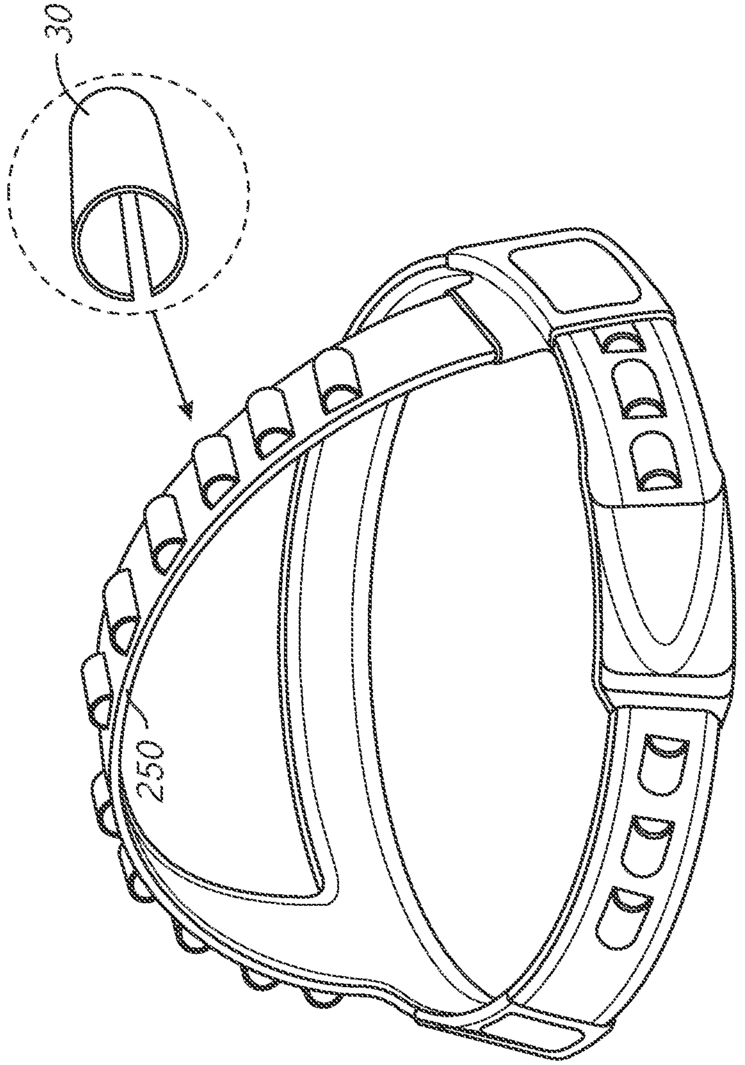
FIG. 27 is a perspective view of a support structure for a helmet incorporating a plurality of batteries.

In some configurations, a substantial number (e.g., 30) of these batteries 30 will provide 24 to 48 hours of operation on one charge. The batteries 30 initially have a planar orientation and can be in the form of a plate or strip. It has been discovered by the present Applicant that the batteries 30 can be modified to have a bent or slightly curved shape. In some configurations, a headband-shaped collection of batteries encircles the inside of a sphere or helmet shape and, in some configurations, one or more strips of batteries 30 extending around a circumference and/or over from the front to back of the headband that will consist of 30 or more of these very slender batteries. Such an arrangement of the batteries 30 can be described as a "crown" battery arrangement and is illustrated in FIG. 27. Such an arrangement makes good use of available space to allow a large number of batteries to be accommodated and to be evenly distributed around the helmet 10. Such an arrangement preserves a desirable weight balance of the helmet 10. In some configurations, the minimum amount to produce 24 to 48 hours of operation is 30 batteries. In some configurations, an additional 30 batteries are utilized in the helmet to achieve 72 hours of operation on a single charge.

Figure 28:
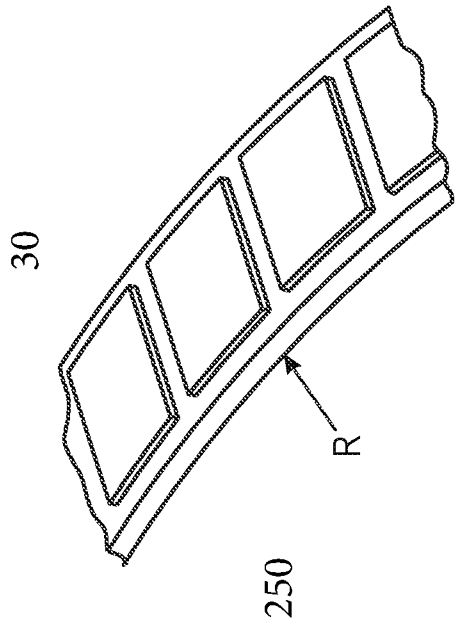
FIG. 28 is a view of a portion of a support structure and alternative battery arrangement.

In the illustrated arrangement, the batteries 30 are carried by a support structure 250, which can form a portion of an interior liner, adjustable fit system or other interior component of the helmet 10. That is, the support structure 250 can form a portion of the helmet 10 that would be present even in the absence of the batteries 30 (or a version or modification of such a structure). In some configurations, the batteries 30 each have a significantly smaller radius of curvature than the helmet 10 or the support structure 250 at the location of the battery 30, as illustrated in FIG. 27. However, in other configurations, the radius of curvature of the batteries 30 can approximate or can be the same as the radius of curvature R of the helmet 10 or support structure 250 at the location at which the battery 250 is mounted, as illustrated in FIG. 28.

Such a battery "crown" can be put in any existing rescue safety helmet, water rescue safety helmet, motorcycle, bicycle or sports helmets. With such an arrangement, enough power is provided for the rescue/signaling lights, the headlamps and additional accessories. For instance, the following features can be provided on the helmet:

1. A camera that can be night vision for real time or recording on a small chip or other memory.

2. Communication listening ear pieces implanted in the helmet.

3. Pinging and GPS locator that can be put in every helmet listed above.

4. Anything else that can be applied to the helmet. For weight considerations, in some configurations it is desired that additional accessories does not exceed 3 g. However, in other configurations, the additional accessories could have a higher mass. In some configurations, this battery crown can support all of these devices that are named in the above description of devices.

An example of a camera that can be employed in the helmet is an ID Carid OEM style bullet back up camera. The helmet can also include a small button camera, such as a video camera with, for example, an 80 foot field of view. Such a camera can be battery powered with, for example, a 4.2 mm lens. Multiple cameras can be used to provide different views relative to the user, such as forward-facing, rearward-facing, right-facing and left-facing cameras, for example.

Other batteries or power sources can also be used. In some configurations, the battery specifications can be as follows: weight: 25 g, size: 1.35"×2.55"×0.23" (35 mm×65 mm×5.5 mm), output: 1200 mAh at 3.7V nominal.

Inflatable System

As described above, in some configurations, the helmet 10 or lighting systems can be inflatable to provide some amount of buoyancy to the helmet 10. The buoyancy provided may be sufficient to allow the helmet 10 to float or could be a lesser or greater amount of buoyancy. For example, the helmet 10 could be configured to assist a wearer in keeping his or her head floating when the wearer is in a body of water.

Figure 29:
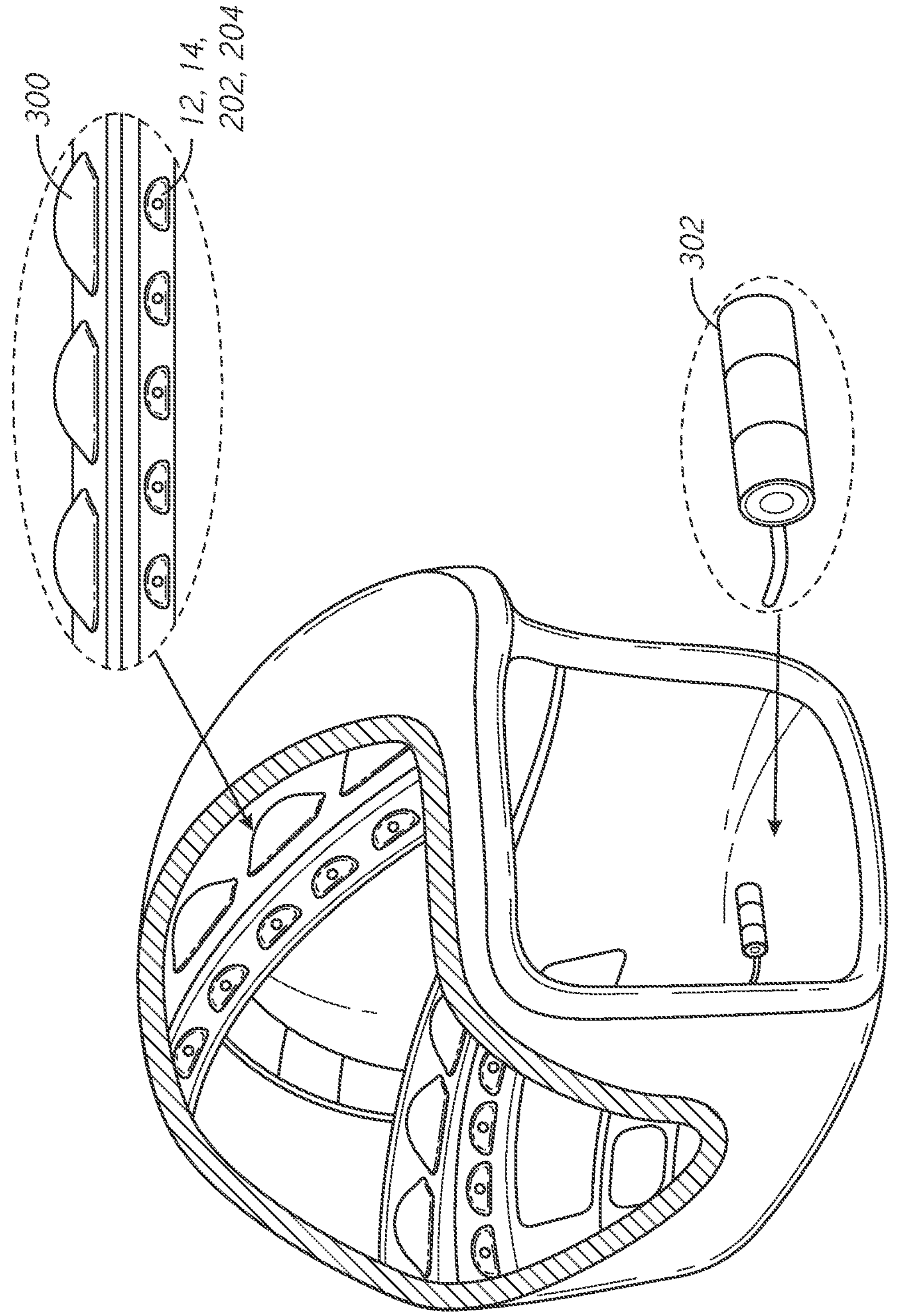
FIG. 29 is a perspective, partial cut-away view of a helmet comprising a light system and an inflation system.
Figure 32:
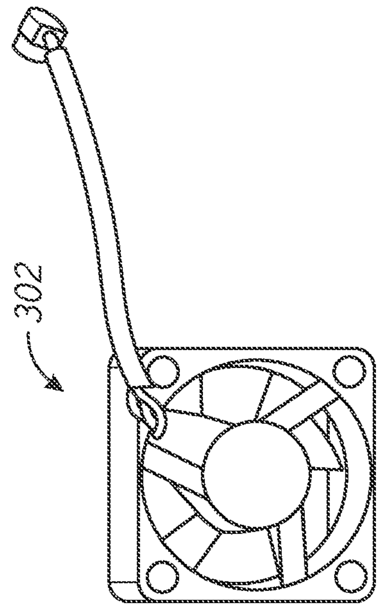
FIG. 32 is a perspective view of an inflation device in the form of a single fan.
Figure 33:
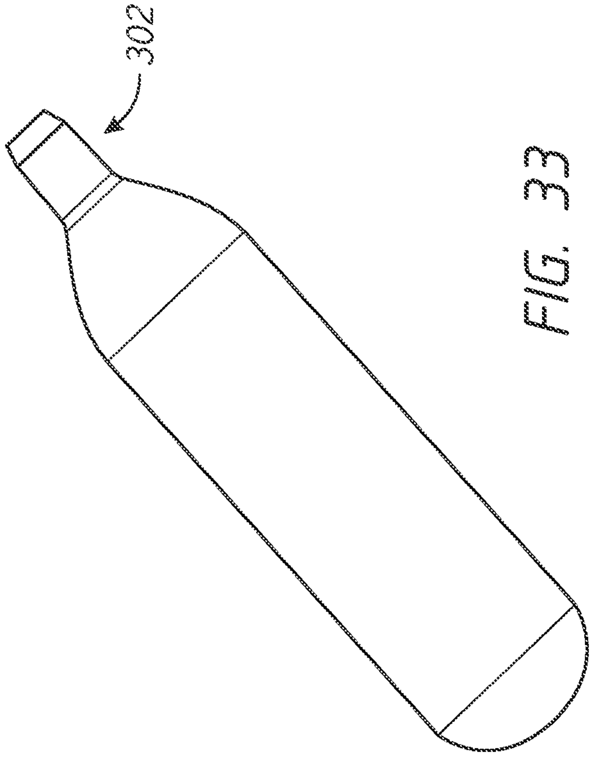
FIG. 33 is a perspective view of an inflation device in the form of a compressed gas canister.
Figure 31:
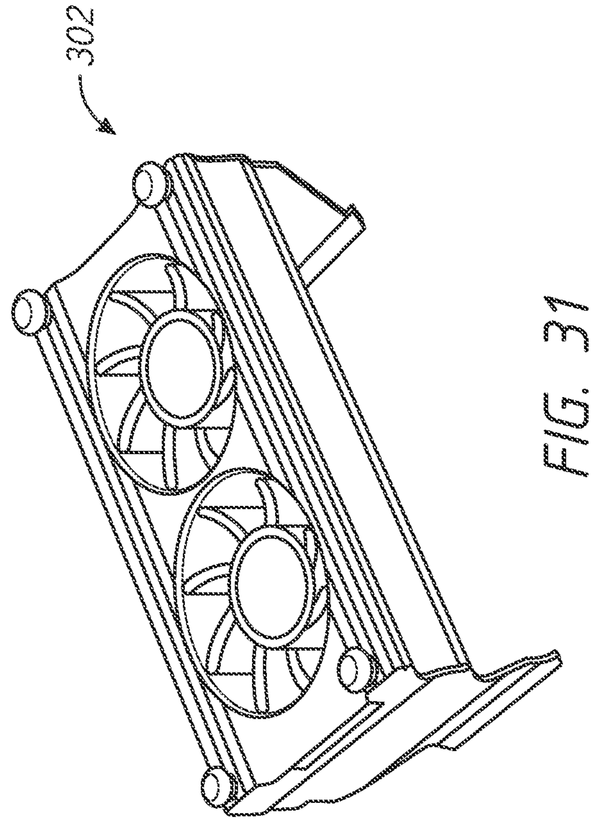
FIG. 31 is a perspective view of an inflation device in the form of a dual fan.

FIG. 29 illustrates a system in which one or more inflatable devices 300 are positioned in a strip-like fashion separately from the lights 12, 14, 202, 204. The inflatable devices 300 can be position within the helmet 10, such as within the interior of the helmet 10 (e.g., in between the shell 20 and interior padding or liner), as illustrated in FIG. 29. The inflatable devices 300 can be carried by a support structure, similar to the crown battery support structure 250. The inflatable devices 300 can be between layers of the helmet (e.g., between the outer layer 24 and inner layer 26). The inflatable devices 300 could also be secured to an exterior surface of the helmet 10. As described above, the inflatable devices 300 can be constructed from two layers of a flexible material that are secured to one another along the edges or along one or more perimeters to create one or more spaces configured to be inflated by air or another gas. If multiple devices 300 or spaces are provided, two or more of the individual spaces can be interconnected to reduce the number of inflation sources required. In some configurations, all of the devices 300 or spaces are interconnected (e.g., through interconnecting channels or passages) such that only a single inflation source is needed. The inflation device 302 can be any suitable device configured to fill the devices 300 or spaces with a gas. For example, the inflation device 302 can be a fan, as illustrated in FIGS. 31 and 32, or can be a compressed gas canister, as shown in FIG. 33. The gas canister 302 is simple, but is not reusable or at least not repeatedly reusable and is not easily reversible. The gas canister 302 can be replaced once exhausted for future use of the helmet 10. The fans 302 are more complex, but reusable and reversible. Other inflation arrangements can also be used.

Figure 30:
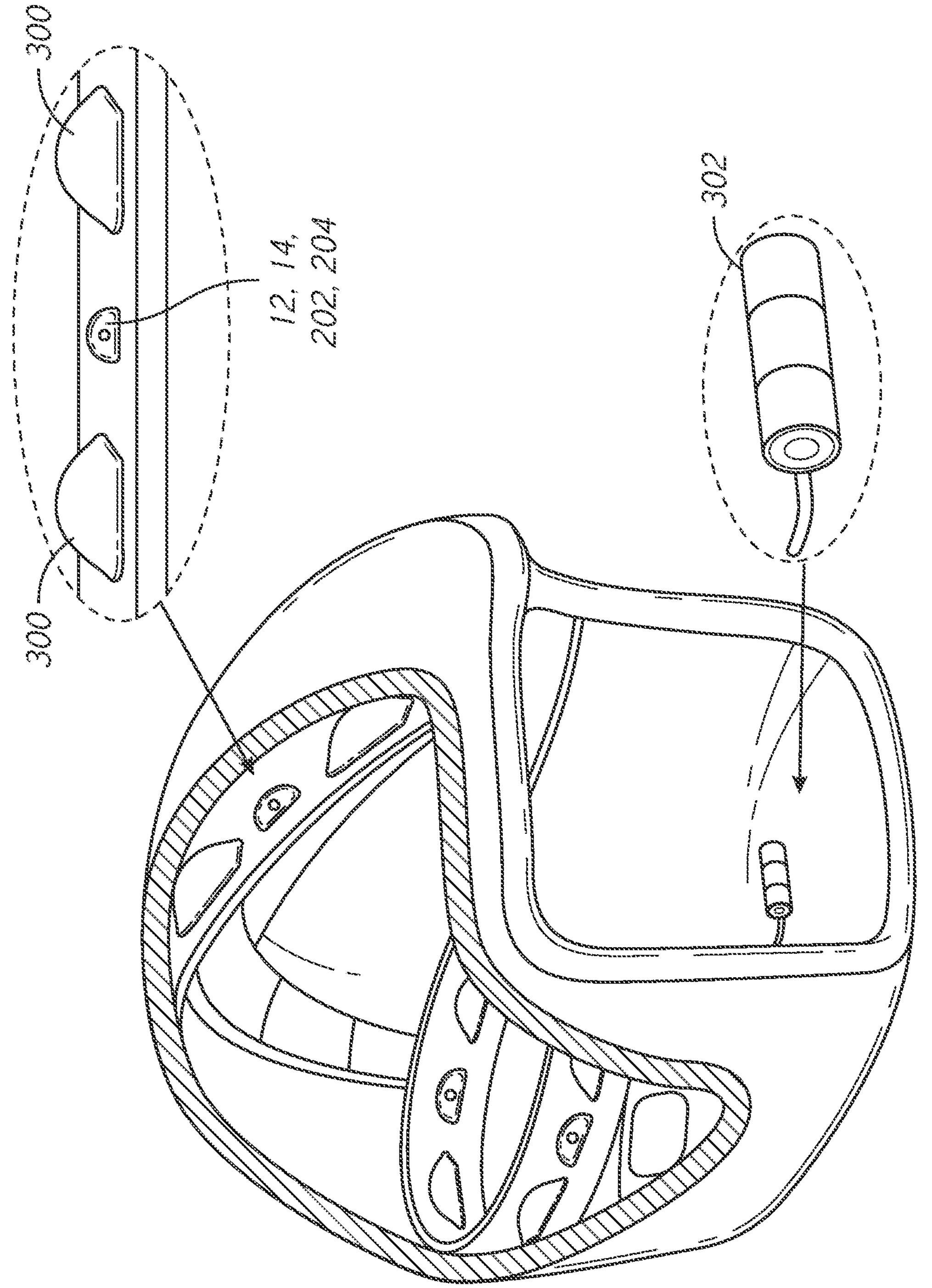
FIG. 30 is a perspective, partial cut-away view of helmet comprising an alternative light and inflation system.

FIG. 30 illustrates an arrangement in which the devices 300 or spaces are positioned between lights of the helmet 10.

In some cases, the devices 300 or spaces can be provided in alternating fashion. FIG. 30 illustrates a canister inflating device 302; however, a fan inflating device 302 could also be used. In other respects, the helmet of FIG. 30 can be substantially the same as the helmet of FIG. 29.

Painting

In some configurations, an outer (and, in some cases, inner) layer of the helmet is clear, translucent or transparent and at least a portion of the outer surface is painted or otherwise covered, preferably leaving portions through which light from internal light sources can pass. A suitable process for painting helmets and using stencils can comprise one or more of the following steps:

1. Raw plastic surface of the helmet gets sanded with, for example, 600 grit dry paper,
2. Prepare clear coated urethane adhesion promoter,
3. Air dry overnight,
4. Repeat sanding with 600 grit dry paper,
5. Apply spray mask to LED lights (stencils),
6. Apply base coat color (water base with hardener),
7. Air dry overnight,
8. Remove spray mask patterns (stencils),
9. Apply three coats of urethane clear coat,
10. Sand with 600 grit dry paper,
11. Air dry overnight,
12. Sand with 600 grit dry paper, and
13. Apply semi-gloss urethane clear coat.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term “substantially” means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of “about 1 to 5” should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as “about 1 to about 3,” “about 2 to about 4” and “about 3 to about 5,” “1 to 3,” “2 to 4,” “3 to 5,” etc. This same principle applies to ranges reciting only one numerical value (e.g., “greater than about 1”) and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms “and” and “or” are used in conjunction with a list of items, they are to be interpreted broadly, in that any one or more of the listed items may be used alone or in combination with other listed items. The term “alternatively” refers to selection of one of two or more alternatives, and is not intended to limit the selection to only those listed alternatives or to only one of the listed alternatives at a time, unless the context clearly indicates otherwise.

What is claimed is:

1. A lighting system for an underlying helmet, the lighting system comprising:

at least one light pod comprising at least one light source;

a light pod enclosure;

at least one light strip comprising at least one light source;

a light strip enclosure, each of the light pod enclosure and the light strip enclosure comprising an interior space therewithin, the space being sealed to prevent ingress of water into the space;

a source of power for powering the light sources, wherein the source of power is contained within an enclosure that is separate from each of the light pod enclosure and the light strip enclosure;

a controller for controlling the power provided to the light sources; and a plurality of electrical conduits for communicating between the light sources, the source of power and the controller;

wherein at least the light sources and portions of the electrical conduits are encapsulated within the space;

wherein the light pod enclosure and light strip enclosure are each configured to be attached to the underlying helmet and cover only a portion of the underlying helmet.

2. The lighting system of claim 1, wherein the light pods and light strips are attached to the underlying helmet by an adhesive.

3. The lighting system of claim 1, wherein each of the light pod enclosure and the light strip enclosure further comprises a base layer and a cover layer, the base layer and the cover layer defining the space therebetween, the base layer and the cover layer being sealed relative to one another to prevent ingress of water into the space.

4. The lighting system of claim 3, wherein the base layer is dark.

5. The lighting system of claim 1, wherein the space tightly encloses the light sources and electrical conduits.

6. A helmet with a lighting system, comprising:

a helmet body comprising a structural layer and an outer surface;

a first light strip comprising a first plurality of light sources attached to the helmet body;

a first light strip enclosure comprising a first interior space therewithin, which is sealed to prevent ingress of water into the first interior space;

a second light strip comprising a second plurality of light sources attached to the helmet body;

a second light strip enclosure comprising a second interior space therewithin, which is sealed to prevent ingress of water into the second interior space;

wherein the first light strip and the first light strip enclosure are separate and spaced apart from the second light strip and the second light strip enclosure on the helmet body;

a source of power for powering the light sources, wherein the source of power is contained within an enclosure that is separate from each of the first light strip enclosure and the second light strip enclosure;

a controller for controlling the power provided to the first plurality of light sources and the second plurality of light sources; and a plurality of electrical conduits for communicating between the first plurality of light sources, the second plurality of light sources, the source of power, and the controller.

7. The helmet with a lighting system of claim 6, wherein the plurality of electrical conduits extend between and are external to two or more of the enclosure, the first light strip enclosure and the second light strip enclosure.

8. The helmet with a lighting system of claim 6, wherein controller is contained within the enclosure along with the source of power.

9. The helmet with a lighting system of claim 6, wherein each of the first light strip enclosure and the second light strip enclosure comprises a base layer and a cover layer.

* * * * *